US012717484B2

(12) United States Patent
Eckel et al.

(10) Patent No.: US 12,717,484 B2
(45) Date of Patent: Aug. 25, 2026

(54) INTERFACE LAYOUT FOR STACKED MEMORY ARCHITECTURES

(71) Applicant: Micron Technology, Inc., Boise, ID (US)

(72) Inventors: Nathan A. Eckel, Lufkin, TX (US); Lance P. Johnson, Saint Paul, MN (US); Paul A. Laberge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 18/670,074

(22) Filed: May 21, 2024

(65) Prior Publication Data

US 2024/0402909 A1 Dec. 5, 2024
US 2025/0370621 A2 Dec. 4, 2025

Related U.S. Application Data

(60) Provisional application No. 63/470,651, filed on Jun. 2, 2023.

(51) Int. Cl.
*G06F 3/06* (2006.01)

(52) U.S. Cl.
CPC ............ *G06F 3/0611* (2013.01); *G06F 3/064* (2013.01); *G06F 3/0683* (2013.01)

(58) Field of Classification Search
CPC ...... G06F 3/0611; G06F 3/064; G06F 3/0683; G06F 13/16; G06F 13/1668
See application file for complete search history.

(56) References Cited

U.S. PATENT DOCUMENTS

2019/0042120 A1* 2/2019 Kajigaya ............... G06F 3/0625
2020/0194412 A1* 6/2020 Brewer .................. G11C 29/52

* cited by examiner

*Primary Examiner* — Eric Cardwell
(74) *Attorney, Agent, or Firm* — Holland & Hart LLP

(57) ABSTRACT

Methods, systems, and devices for an interface layout for stacked memory architectures are described. A memory interface block may interface a plurality of memory dies to a host controller. The memory interface block may include an interface block coupled with multiple memory dies, which may be stacked on the memory interface block using through-silicon-vias. The memory interface block may include controllers, datapath blocks, and interface blocks associated with each memory die. As such, the memory interface block may perform functions such as queueing, ECC, and performing row repair and column repair procedures. In some examples, a layout for the memory interface block may include pairing controllers for at least two memory devices, such that a pair of controllers may share a command port to a pair of memory dies. Further, the memory interface block may include interfaces to the host controller that are different from the interface to each memory die.

20 Claims, 8 Drawing Sheets

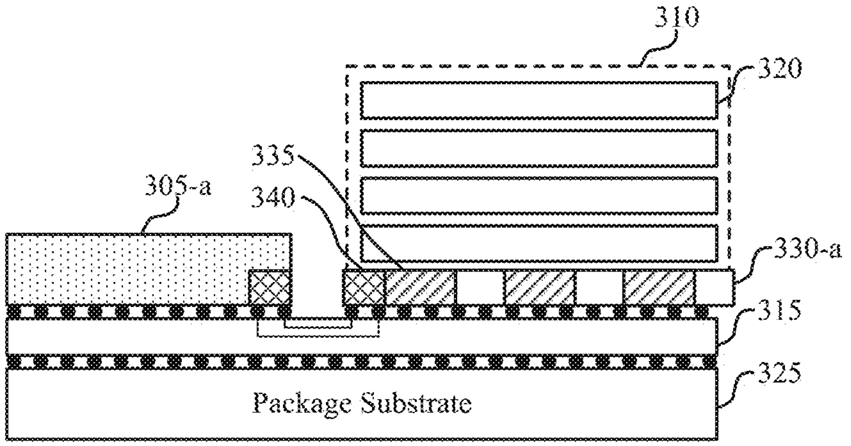
FIG. 3A
300-a
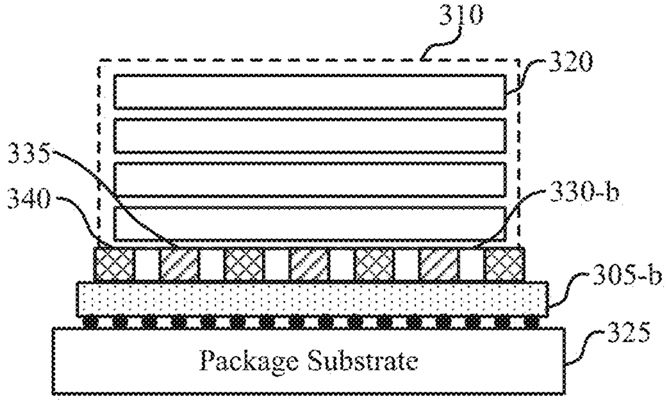
FIG. 3B
300-b
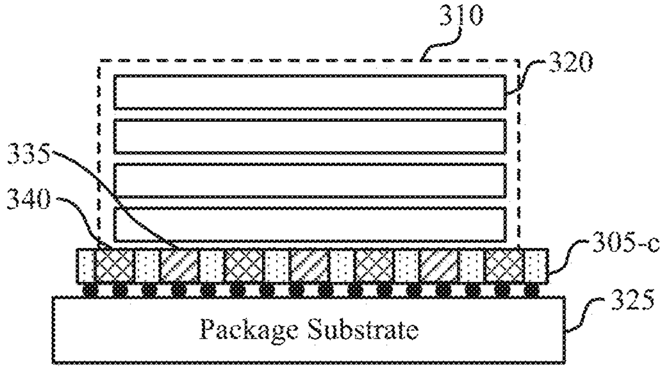
FIG. 3C
300-c
310
320
335
305-a
340
330-a
315
325
Package Substrate
300-a
310
320
335
340
330-b
305-b
325
Package Substrate
300-b
310
320
335
340
305-c
325
Package Substrate
300-c
Physical Interface 340
Memory Interface Block 335
ASIC 305

INTERFACE LAYOUT FOR STACKED MEMORY ARCHITECTURES

CROSS REFERENCE

The present Application for Patent claims priority to U.S. Patent Application No. 63/470,651 by Eckel et al., entitled "INTERFACE LAYOUT FOR STACKED MEMORY ARCHITECTURES," filed Jun. 2, 2023, which is assigned to the assignee hereof, and which is expressly incorporated by reference in its entirety herein.

TECHNICAL FIELD

The following relates to one or more systems for memory, including an interface layout for stacked memory architectures.

BACKGROUND

Memory devices are widely used to store information in devices such as computers, user devices, communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when disconnected from an external power source.

BRIEF DESCRIPTION OF THE DRAWINGS

FIGS. 3A-3C shows examples of devices that support an interface layout for stacked memory architectures in accordance with examples as disclosed herein.

DETAILED DESCRIPTION

Figure 1:
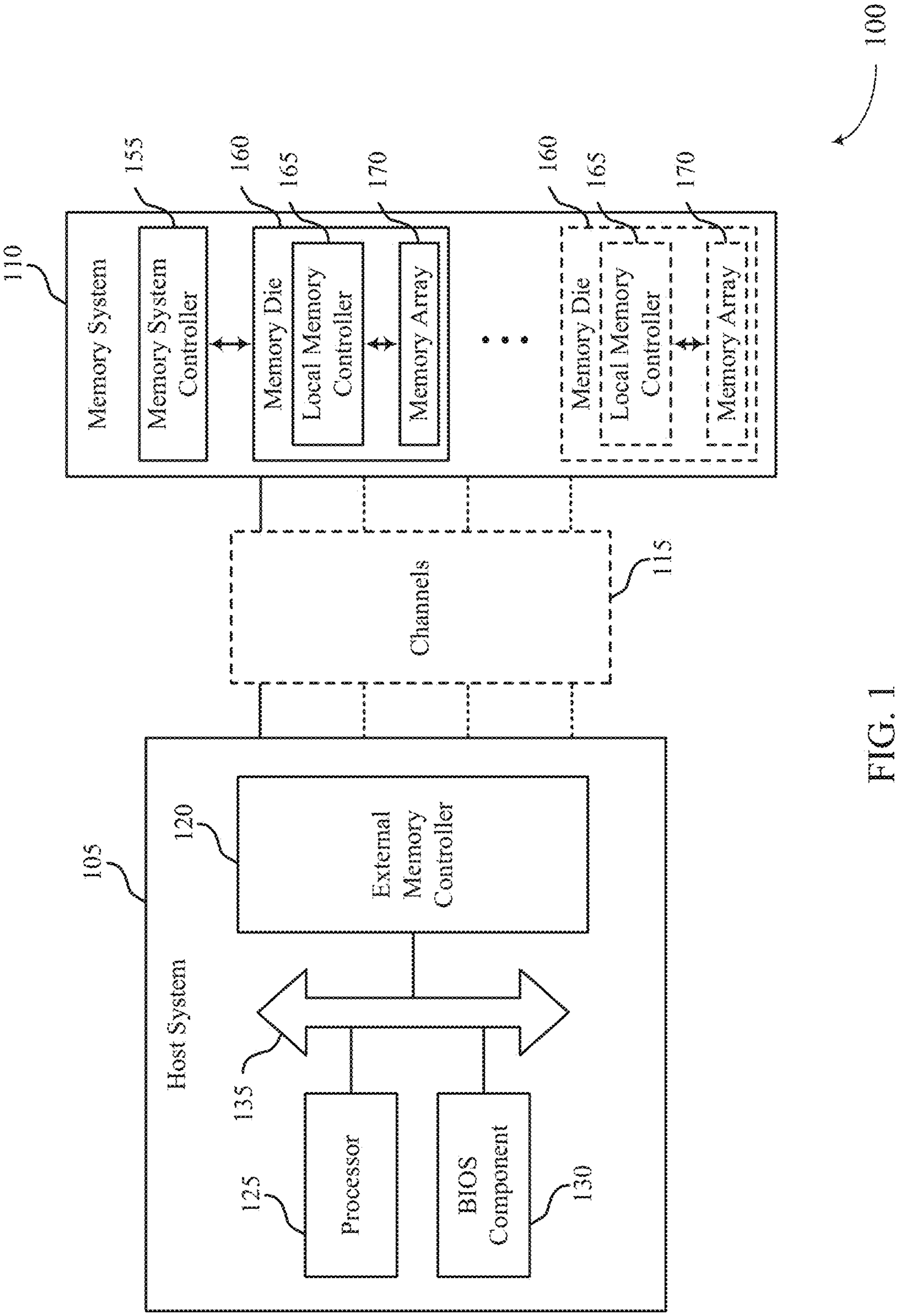
FIG. 1 shows an example of a system that supports an interface layout for stacked memory architectures in accordance with examples as disclosed herein.

In some examples, to support intensive operations such as graphics performance or artificial intelligence operations, improving the performance of memory systems may be desired. For example, memory systems may become larger, therefore increasing the capacity of the memory systems. In some cases, however, larger memory systems may result in more latency for operations performed by the memory systems. Further, a larger quantity of interface components may be needed for these memory systems, which may add difficulty to increasing the capacity of memory systems. As such, techniques for arranging components of a memory systems efficiently and without increasing latency as memory systems increase in size may be desired.

Techniques and examples are described herein to instantiate a memory interface block that interfaces to a host controller (e.g., a graphical processing unit (GPU), an artificial intelligence processor, or another host controller). The memory interface block may include an interface block coupled with multiple memory dies, which may be stacked on the memory interface block using through-silicon-vias. The memory interface block may include controllers, datapath blocks, and interface blocks associated with each memory die. As such, the memory interface block may perform functions such as queueing, executing error correction code (ECC), and performing row repair and column repair procedures. In some examples, a layout for the memory interface block may include pairing controllers for at least two memory devices, such that a pair of controllers may share a command port (e.g., drivers) to a pair of memory dies. Further, the memory interface block may include interfaces to the host controller that are different from the interface to each memory die. For example, the interface to the host controller may be synchronous, and may have independent channels for read and write operations, while the interface to each memory die may be asynchronous and include channels that perform both read (e.g., access) and write operations. Accordingly, the memory interface block layout may support forming larger-capacity and higher-density memory devices efficiently and with reduced latency.

In addition to applicability in memory systems as described herein, techniques for an interface layout for stacked memory architectures may be generally implemented to support artificial intelligence or analytics applications. As the use of artificial intelligence increases to support machine learning, analytics, decision making, or other related applications, semiconductor systems that support artificial intelligence applications and processes may be desired. For example, artificial intelligence applications may be associated with accessing relatively large quantities of data for analytical purposes and may benefit from memory systems capable of effectively and efficiently storing relatively large quantities of data or accessing stored data relatively quickly. Implementing the techniques described herein may support artificial intelligence or machine learning techniques by providing larger bandwidth memory devices with higher memory densities, which may be coupled more directly with host processing capabilities, among other benefits.

Features of the disclosure are initially described in the context of systems, dies, and devices as described with reference to FIGS. 1 through 5. Features of the disclosure are described in the context of contact layouts as described with reference to FIG. 6. These and other features of the disclosure are further illustrated by and described with reference to a flowcharts that relates to an interface layout for stacked memory architectures as described with reference to FIGS. 7.

FIG. 1 illustrates an example of a system 100 that supports an interface layout for stacked memory architectures in coupled semiconductor systems in accordance with examples as disclosed herein. The system 100 may include portions of an electronic device, such as a computing device, a mobile computing device, a communications device, a graphics processing device, a vehicle, or other systems. The system 100 includes a host system 105, a memory system 110, and one or more channels 115 coupling the host system 105 with the memory system 110 (e.g., to provide a communicative coupling). The system 100 may include one or more memory systems 110, but aspects of the one or more memory systems 110 may be described in the context of a single memory system 110.

The host system 105 may be an example of a processor (e.g., circuitry, processing circuitry, a processing component) that uses memory to execute processes, such as a processing system of a computing device, a mobile computing device, a communications device, a graphics processing device, a wearable device, an internet-connected device, a vehicle controller, a system on a chip (SoC), or other stationary or portable electronic device, among other examples. The host system 105 may include one or more of an external memory controller 120, a processor 125, a basic input/output system (BIOS) component 130, or other components (e.g., a peripheral component, an input/output controller, not shown). The components of the host system 105 may be coupled with one another using a bus 135.

An external memory controller 120 may be configured to enable communication of information (e.g., data, commands, control information, configuration information) between components of the system 100 (e.g., between components of the host system 105, such as the processor 125, and the memory system 110). An external memory controller 120 may process (e.g., convert, translate) communications exchanged between the host system 105 and the memory system 110. In some examples, an external memory controller 120, or other component of the system 100, or associated functions described herein, may be implemented by or be part of the processor 125. For example, an external memory controller 120 may be hardware, firmware, or software (e.g., instructions), or some combination thereof implemented by a processor 125 or other component of the system 100 or the host system 105. Although an external memory controller 120 is illustrated outside the memory system 110, in some examples, an external memory controller 120, or its functions described herein, may be implemented by one or more components of a memory system 110 (e.g., a memory system controller 155, a local memory controller 165) or vice versa. In various examples, the host system 105 or an external memory controller 120 may be referred to as a host.

A processor 125 may be operable to provide functionality (e.g., control functionality) for the system 100 or the host system 105. A processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. In some examples, a processor 125 may be an example of a central processing unit (CPU), a graphics processing unit (GPU), a general-purpose GPU (GPGPU), or an SoC, among other examples.

In some examples, the system 100 or the host system 105 may include an input component, an output component, or a combination thereof. Input components may include a sensor, a microphone, a keyboard, another processor (e.g., on a printed circuit board), an interface (e.g., a user interface, an interface between other devices), or a peripheral that interfaces with system 100 via one or more peripheral components, among other examples. Output components may include a display, audio speakers, a printing device, another processor on a printed circuit board, or a peripheral that interfaces with the system 100 via one or more peripheral components, among other examples.

The memory system 110 may be a component of the system 100 that is operable to provide physical memory locations (e.g., addresses) that may be used or referenced by the system 100. The memory system 110 may include a memory system controller 155 and one or more memory dies 160 (e.g., memory chips) to support a capacity for data storage. The memory system 110 may be configurable to work with one or more different types of host systems 105, and may respond to and execute commands provided by the host system 105 (e.g., via an external memory controller 120). For example, the memory system 110 (e.g., a memory system controller 155) may receive a write command indicating that the memory system 110 is to store data received from the host system 105, or receive a read command indicating that the memory system 110 is to provide data stored in a memory die 160 to the host system 105, or receive a refresh command indicating that the memory system 110 is to refresh data stored in a memory die 160, among other types of commands and operations.

A memory system controller 155 may include components (e.g., circuitry, logic) operable to control operations of the memory system 110. A memory system controller 155 may include hardware, firmware, or instructions that enable the memory system 110 to perform various operations, and may be operable to receive, transmit, or execute commands, data, or control information related to operations of the memory system 110. A memory system controller 155 may be operable to communicate with one or more of an external memory controller 120, one or more memory dies 160, or a processor 125. In some examples, a memory system controller 155 may control operations of the memory system 110 in cooperation with a local memory controller 165 of a memory die 160.

Each memory die 160 may include a local memory controller 165 and a memory array 170. A memory array 170 may be a collection of memory cells, with each memory cell being operable to store one or more bits of data. A memory die 160 may include a two-dimensional (2D) array of memory cells, or a three-dimensional (3D) array of memory cells. In some examples, a memory die 160 may include two or more memory arrays 170, which may be stacked or positioned beside one another (e.g., relative to a substrate).

A local memory controller 165 may include components (e.g., circuitry, logic) operable to control operations of a memory die 160. In some examples, a local memory controller 165 may be operable to communicate (e.g., receive or transmit data or commands or both) with a memory system controller 155. In some examples, a memory system 110 may not include a memory system controller 155, and a local memory controller 165 or an external memory controller 120 may perform various functions described herein. As such, a local memory controller 165 may be operable to communicate with a memory system controller 155, with other local memory controllers 165, or directly with an external memory controller 120, or a processor 125, or any combination thereof. Examples of components that may be included in a memory system controller 155 or a local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, sense components for sensing states of memory cells of a memory array 170, write components for writing states to memory cells of a memory array 170, or various other components operable for supporting described operations of a memory system 110.

A host system 105 (e.g., an external memory controller 120) and a memory system 110 (e.g., a memory system controller 155) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, an electrically conductive path) between terminals associated with the components of the system 100. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel 115. In some implementations, at least the channels 115 between a host system 105 and a memory system 110 may include or be referred to as a host interface (e.g., a physical host interface). In some implementations, a host interface may include or be associated with interface circuitry (e.g., signal drivers, signal latches) at the host system 105 (e.g., at an external memory controller 120), or at the memory system 110 (e.g., at a memory system controller 155), or both.

In some examples, a channel 115 (e.g., associated signal paths and terminals) may be dedicated to communicating one or more types of information. For example, the channels 115 may include one or more command and address channels, one or more clock signal channels, one or more data channels, among other channels or combinations thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols of a signal may be registered for each clock cycle (e.g., on both a rising edge and a falling edge of a clock signal). In some cases, the channel 115 may be or include one or more memory interfaces, such as an Advanced eXtensible Interface (AXI), for communicating signaling.

In some implementations, a memory system 110 may include one or more data paths between memory arrays 170 and a host interface (e.g., between memory arrays 170 and channels 115, between memory arrays 170 and at least a portion of a memory system controller 155). To support a data rate along a data path, the memory system 110 may include SERDES circuitry that converts signaling between relatively slower signaling using relatively more signal paths and relatively faster signaling using relatively fewer signal paths. However, SERDES circuitry, among other data path circuitry, may involve multiple stages of signal amplification to maintain signal integrity along the data path, which may occupy an area of a memory die, or may be associated with a power consumption at the memory die, among other characteristics.

In accordance with examples as disclosed herein, a memory interface block may be instantiated (e.g., within the memory system 110) that interfaces with the host system 105 (e.g., via the external memory controller 120). The memory interface block may include one or more contacts coupled with multiple memory dies 160, which may be stacked on the memory interface block using through-silicon-vias. The memory interface block may include controllers, datapath blocks, and interface blocks (e.g., for a host system 105) associated with each memory die 160. As such, the memory interface block may perform functions such as queueing, executing ECC, and performing row repair and column repair procedures for each of the memory dies 160, while functioning as an interface with the host system 105.

In some examples, a layout for the memory interface block may include pairing controllers for at least two memory dies 160, such that a pair of controllers may share a command port to a pair of memory dies 160. Further, the memory interface block may include interfaces to the host controller that are different than the interface to each memory die. For example, the interface to the host controller may be synchronous, and may have independent channels for read and write operations, while the interface to each memory die may be asynchronous and include channels that perform both read (e.g., access) and write operations. Accordingly, the memory interface block layout may support forming larger-capacity and higher-density memory devices efficiently and with reduced latency.

Figure 2:
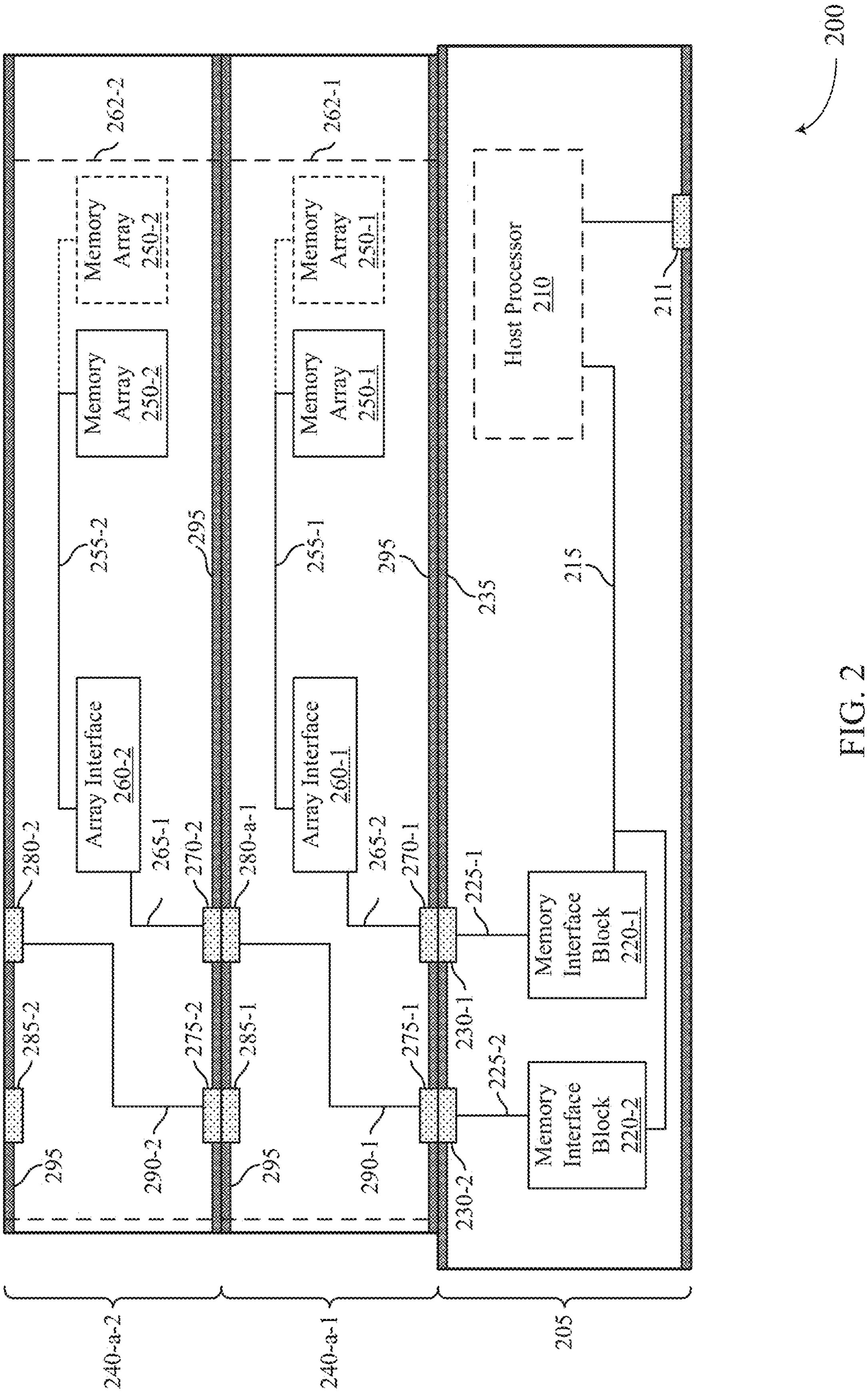
FIG. 2 shows an example of a memory die that supports an interface layout for stacked memory architectures in accordance with examples as disclosed herein.

FIG. 2 shows an example of a system 200 that supports an interface layout for stacked memory architectures in accordance with examples as disclosed herein. The system 200 illustrates an example of a substrate 205 (e.g., a semiconductor die, a host die, a processor die, a logic die, a GPU die) that is coupled with one or more memory dies 240 (e.g., memory die 240-1 and memory die 240-2, semiconductor dies, memory array dies). A substrate 205 or a memory die 240 may be formed using a respective semiconductor substrate (e.g., a substrate of crystalline semiconductor material such as silicon, germanium, silicon-germanium, gallium arsenide, or gallium nitride), or a silicon-on-insulator (SOI) substrate (e.g., silicon-on-glass (SOG), silicon-on-sapphire (SOS)), or epitaxial semiconductor materials formed on another substrate, among other examples. Although the illustrated example of a system 200 includes two memory dies 240, a system 200 in accordance with the described techniques may include any quantity of one or more memory dies 240 coupled with a substrate 205.

The system 200 illustrates an example of interface circuitry between a host and memory (e.g., via a host interface, via a physical host interface) that is implemented in (e.g., divided between) multiple semiconductor memory dies. For example, the substrate 205 may include a set of one or more memory interface blocks 220 (e.g., memory interface block 220-1 and memory interface block 220-2), and each memory die 240 may include a set of one or more array interfaces 260 and one or more memory arrays 250 (e.g., memory die 240-1 including an array interface 260-1 coupled with a set of one or more memory arrays 250-1, memory die 240-2 including an array interface 260-2 coupled with a set of one or more memory arrays 250-2). In some implementations, the substrate 205 also may include a host processor 210. However, in some other implementations, a host processor 210 may be external to a substrate 205, such as in another semiconductor memory die or other component that is coupled with (e.g., communicatively coupled with, directly coupled with) the substrate 205 via one or more contacts 211. Although the example of system 200 is illustrated with one array interface 260 included in each memory die 240, a memory die 240 in accordance with the described techniques may include any quantity of one or more array interfaces 260, each coupled with a respective set of one or more memory arrays 250, and each coupled with a respective memory interface block 220 of a substrate 205. Thus, the interface circuitry of a system 200 may include one or more interface blocks 220 of a substrate 205, with each memory interface block 220 being coupled with (e.g., in communication with) a corresponding array interface 260 of a memory die 240 (e.g., external to the substrate 205). In some examples, a coupled combination of a memory interface block 220 and an array interface 260 may include or be referred to as a data path associated with a respective set of one or more memory arrays 250.

The host processor 210 may be an example of a host system 105, or a portion thereof (e.g., a processor 125, an external memory controller 120, or both). The host processor 210 may be configured to perform operations that utilize storage of the memory arrays 250. For example, the host processor 210 may receive data read from the memory arrays 250, or transmit data to be written to the memory arrays 250, or both (e.g., in accordance with an application or other operations of the host processor 210). The memory arrays 250 may be examples of memory arrays 170, and may include memory cells of various architectures, such as RAM, DRAM, SDRAM, SRAM, FeRAM, MRAM, RRAM, PCM, chalcogenide, NOR, or NAND memory cells, or any combination thereof. The host processor 210 may be configured to communicate (e.g., transmit, receive) signaling with the interface blocks 220 over a host interface 215 (e.g., a physical host interface), which may implement aspects of channels 115 described with reference to FIG. 1. For example, the host processor 210 may be configured to transmit access signaling (e.g., control signaling, access command signaling), which may be received by the interface blocks 220 to support access operations (e.g., read operation, write operations) on the memory arrays 250.

A host interface 215 may include a respective set of one or more signal paths for each memory interface block 220, such that the host processor 210 communicates with each memory interface block 220 over the respective set of signal paths (e.g., in accordance with a selection of the respective set to perform access operations via a memory interface block 220 that is selected by the host processor 210). Additionally, or alternatively, a host interface 215 may include one or more signal paths that are shared among multiple interface blocks 220, and a memory interface block 220, or a host processor 210, or both may interpret, ignore, respond to, or inhibit response to signaling over shared signal paths of the host interface 215 based on a logical indication (e.g., an addressing indication associated with the memory interface block 220 or an interface enable signal, which may be provided by the host processor 210 or the corresponding memory interface block 220, depending on signaling direction).

Each memory interface block 220 may be coupled with at least a respective bus 225 of the substrate 205, and a respective bus 265 of a memory die 240, that is configured to communicate signaling with the corresponding array interface 260 (e.g., over one or more associated signal paths). For example, the memory interface block 220-1 may be coupled with the array interface 260-1 via a bus 225-1 and a bus 265-1, and the memory interface block 220-2 may be coupled with the array interface 260-2 via a bus 225-2 and a bus 265-2. In some examples, a memory die 240 may include a bus that bypasses operational circuitry of the memory die 240 (e.g., bypasses array interfaces 260 of a given memory die 240), such as a bus 290. For example, the memory interface block 220-2 may be coupled with the array interface 260-2 of the memory die 240-2 via a bus 290-1 of the memory die 240-1, which may bypass array interfaces 260 of the memory die 240-1. Other busses such as bus 290-2 may be coupled with contacts of other memory die 240 but remain unconnected to substrate 205. For example, bus 290-2 may couple contacts 275-2 to contacts 280-2. In addition, contacts 285-2 of memory die **240-*a*-2 may not be connected to another memory die 240. Such techniques may be extended for interconnection among more than two memory dies 240 (e.g., for interconnection via a respective bus 290 of multiple memory dies 240**).

The respective signal paths of the buses 225, 265, and 290 may be coupled with one another, from one memory die to another, via various arrangements of contacts at the surfaces of interfacing memory dies. For example, the bus 225-1 may be coupled with the bus 265-1 via a contact 230-1 of (e.g., at a surface of) the substrate 205 and a contact 270-1 of the memory die 240-1, the bus 225-2 may be coupled with the bus 290-1 via a contact 230-2 of the substrate 205 and a contact 275-1 of the memory die 240-1, the bus 290-1 may be coupled with the bus 265-2 via a contact 280-1 of the memory die 240-1 and a contact 270-2 of the memory die 240-2, and so on. Although each respective bus is illustrated with a single line, coupled via singular contacts, it is to be understood that each signal path of a bus may be associated with respective contacts to support a separate communicative coupling via each signal path of a given bus. In some examples, a bus 290 may traverse a portion of a memory die 240 (e.g., in an in-plane direction, along a direction different from a thickness direction, in a waterfall arrangement), which may support an arrangement of contacts 230 along a surface of the substrate 205 being coupled with array interfaces 260 of different memory dies 240 along a stack direction (e.g., via contacts 275 and 280 that are non-overlapping when viewed along a thickness direction).

The interconnection of interfacing contacts may be supported by various techniques. For example, in a hybrid bonding implementation, interfacing contacts may be coupled by a fusion of conductive materials (e.g., electrically conductive materials) of the interfacing contacts (e.g., without solder or other intervening material between contacts). For example, in an assembled condition, the coupling of the substrate 205 with the memory die 240-1 may include a conductive material of the contact 230-2 being fused with a conductive material of the contact 275-1, and the coupling of the memory die 240-1 with the memory die 240-2 may include a conductive material of the contact 280-1 being fused with a conductive material of the contact 270-2, and so on. In some examples, such coupling may include an inoperative fusion of contacts (e.g., a non-communicative coupling, a physical coupling), such as a fusion of the contact 285-1 with the contact 275-2, neither of which are coupled with operative circuitry of the memory dies 240-1 or 240-2. In some examples, such techniques may be implemented to improve coupling strength or uniformity (e.g., implementing contacts 285, which may not be operatively coupled with an array interface 260 or a memory interface block 220), or such a coupling may be a byproduct of a repetition of components that, in various configurations, may be operative or inoperative. (e.g., where, for memory dies 240 with a common arrangement of contacts 275 and 285, contacts 275-1 and 280-1 provide a communicative path for the array interface 260-2 and the memory interface block 220-2, but the contacts 275-2 and 280-2 do not provide a communicative path between an array interface 260 and a memory interface block 220).

In some examples, a fusion of conductive materials between memory dies (e.g., between contacts) may be accompanied by a fusion of other materials at one or more surfaces of the interfacing memory dies. For example, in an assembled condition, the coupling of the substrate 205 with the memory die 240-1 may include a memory dielectric material 235 (e.g., an electrically non-conductive material) of the substrate 205 being fused with a memory dielectric material 295 of the memory die 240-1, and the coupling of the memory die 240-1 with the memory die 240-2 may include a memory dielectric material 295 of the memory die 240-1 being fused with a memory dielectric material 295 of the memory die 240-2. In some examples, such memory dielectric materials may include an oxide, a nitride, a carbide, an oxide-nitride, an oxide-carbide, or other conversion or doping of a semiconductor material of the substrate 205 or memory dies 240, among other materials that may support such fusion. However, coupling among substrate 205 and memory dies 240 may be implemented in accordance with other techniques, which may implement solder, adhesives, thermal interface materials, and other intervening materials.

In some examples, memory dies 240 may be coupled in a stack (e.g., forming a "cube" or other arrangement of memory dies 240), and the stack may subsequently be coupled with a substrate 205. In some examples, a respective set of one or more memory dies 240 may be coupled with each substrate 205 of multiple substrates 205 formed in a wafer (e.g., in a chip-to-wafer bonding arrangement, before cutting the wafer of substrates 205), and the substrates 205, coupled with their respective set of memory dies 240, may be separated from one another (e.g., by cutting at least the wafer of substrates 205). In some other examples, a respective set of one or more memory dies 240 may be coupled with a respective substrate 205 after the substrate 205 is separated from a wafer of substrates 205 (e.g., in a chip-to-chip bonding arrangement).

The buses 225, 265, and 290 may be configured to provide signaling (e.g., a coordinated signaling, a logical signaling, modulated signaling, digital signaling) between a memory interface block 220 and a corresponding array interface 260, which may involve various modulation or encoding techniques by a transmitting interface block (e.g., via a driver component of the transmitting interface block). In some examples, such signaling may be supported by (e.g., accompanied by) clock signaling communicated via the respective buses (e.g., in coordination with signal transmission). For example, the buses may be configured to convey one or more clock signals transmitted by the memory interface block 220 for reception by the array interface 260 (e.g., to trigger signal reception by a latch or other reception component of the array interface 260, to support clocked operations of the array interface 260). Additionally, or alternatively, the buses may be configured to convey one or more clock signals transmitted by the array interface 260 for reception by the memory interface block 220 (e.g., to trigger signal reception by a latch or other reception component of the memory interface block 220, to support clocked operations of the memory interface block 220). Such clock signals may be associated with the communication (e.g., unidirectional communication, bidirectional communication) of various, such as control signaling, command signaling, data signaling, or any combination thereof. For example, the buses may include one or more signal paths for communications of a data bus (e.g., a DQ bus, via a data interface of the interface blocks) in accordance with one or more corresponding clock signals (e.g., data clock signals), or one or more signal paths for communications of a control bus (e.g., a command/address (C/A) bus, via a command interface of the interface blocks) in accordance with one or more clock signals (e.g., control clock signals), or any combination thereof.

Interface blocks 220 and array interfaces 260 each may include circuitry in various configurations (e.g., hardware configurations, logic configurations, software or instruction configurations) that support the functionality allocated to the respective interface block for accessing a corresponding set of memory arrays 250. For example, interface blocks 220 may include circuitry configured to perform a first subset of operations that support access of the memory arrays 250, and array interfaces 260 may include circuitry configured to support a second subset of operations that support access of the memory arrays 250. In some examples, the interface blocks 220 and array interfaces 260 may support a functional split or distribution of functionality associated with a memory system controller 155, a local memory controller 165, or both across multiple memory dies (e.g., a substrate 205 and at least one memory die 240). Such subsets of operations may include operations performed in response to commands from the host processor 210, or operations performed without commands from the host processor 210 (e.g., operations determined within a memory interface block 220 or within an array interface 260), or various combinations thereof. In some examples, the circuitry of interface blocks 220, or array interfaces 260, or both may include components (e.g., transistors) formed at least in part from doped portions of a substrate of the respective memory die where, in some examples, a substrate of a substrate 205 may have characteristics that are different from those of a substrate of a memory die 240.

In some examples, the interface blocks 220 may include circuitry configured to receive first access command signaling from the host processor 210 (e.g., via a host interface 215, via one or more contacts 211, where applicable), and to transmit second access command signaling to the respective (e.g., coupled) array interface 260 based on (e.g., in response to) the received first access command signaling. The array interfaces 260 may accordingly include circuitry configured to receive the second access command signaling from the respective memory interface block 220, and to access a respective set of one or more memory arrays 250 based on (e.g., in response to) the received second access command signaling. In various examples, the first access command signaling may include access commands that are associated with a type of operation (e.g., a read operation, a write operation, a refresh operation, a memory management operation), which may be associated with an indication of an address of the one or more memory arrays 250 (e.g., a logical address, a physical address). In some examples, the first access command signaling may include an indication of a logical address associated with the memory arrays 250, and circuitry of a memory interface block 220 may be configured to generate the second access command signaling to indicate a physical address associated with the memory arrays 250 (e.g., a row address, a column address, using a logical-to-physical (L2P) table or other mapping or calculation functionality of the memory interface block 220).

In some examples, to support write operations of the system 200, circuitry of the interface blocks 220 may be configured to receive (e.g., from the host processor 210, via a host interface 215, via one or more contacts 211, where applicable) first data signaling associated with the first access command signaling, and to transmit, to one or more array interfaces 260, second data signaling (e.g., associated with second access command signaling) based on received first access command signaling and first data signaling. The array interfaces 260 may accordingly be configured to receive the second data signaling, and to write data to one or more memory arrays 250 (e.g., in accordance with an indicated address associated with the first access command signaling) based on the received second access command signaling and second data signaling. In some examples, the interface blocks 220 may include an error control functionality (e.g., error detection circuitry, error correction circuitry, ECC logic, an ECC engine) that supports the interface blocks 220 generating the second data signaling based on performing an error control operation using the received first data signaling (e.g., detecting or correcting an error in the first data signaling, determining one or more parity bits to be conveyed in the second data signaling and written with the data).

In some examples, to support read operations of the system 200, circuitry of the array interfaces 260 may be configured to read data from the memory arrays 250 based on received second access command signaling, and to transmit first data signaling based on the read data. The interface blocks 220 may accordingly be configured to receive the first data signaling, and to transmit second data signaling (e.g., to the host processor 210, via a host interface 215, via one or more contacts 211, where applicable) based on the received first data signaling. In some examples, the interface blocks 220 may include an error control functionality that supports the interface blocks 220 generating the second data signaling based on performing an error control operation using the received first data signaling (e.g., detecting or correcting an error in the first data signaling, which may include a calculation involving one or more parity bits received with the first data signaling).

In some examples, access command signaling that is transmitted by the interface blocks 220 to the array interfaces 260 may be generated (e.g., based on access command signaling received from a host processor 210, based on initiation signaling received from a host processor 210, without receiving or otherwise independent from signaling from a host processor 210) in accordance with various determination or generation techniques configured at the interface blocks 220 (e.g., based on a configuration for accessing memory arrays 250 that is modified at the interface blocks 220). Such techniques may support the interface blocks 220 configuring aspects of the access operations performed on the memory arrays 250 by a respective array interface 260.

A memory die 240 may include one or more units 262 (e.g., modules) that are separated from a semiconductor wafer having a pattern of units 262. Although each memory die 240 of the system 200 is illustrated with a single unit 262 (e.g., unit 262-1 of memory die 240-1, unit 262-2 of memory die 240-2), a memory die 240 in accordance with the described techniques may include any quantity of units 262, which may be arranged in various patterns (e.g., sets of one or more units 262 along a row direction, sets of one or more units 262 along a column direction, among other patterns). Each unit 262 may include at least the circuitry of a respective array interface 260, along with memory array(s) 250, a bus 255, a bus 265, and one or more contacts 270 corresponding to the respective array interface 260. For example, array interface 260-1 may be coupled with one or more memory arrays 250-1 via bus 255-1 and array interface 260-2 may be coupled with one or more memory arrays 250-2 via bus 255-2. In some examples, where applicable, each unit 262 may also include one or more buses 290, contacts 275, contacts 280, or contacts 285 (e.g., associated with a respective array interface 260 of a unit 262 of a different memory die 240), which may support various degrees of stackability among or via units 262 of other memory dies 240.

In some cases, a host processor 210 may be part of an efficient and high-performance based solution for memory-centric logic (e.g., a GPU), which may benefit from higher amounts of memory with low-latency. In some cases, cache-based memory may be used to provide the low-latency memory. However, the use of memory caches may be associated with unpredictability of times for accessing memory, as data is fetched from the memory cache or other external memory at the start of an access operation. As such, the system may use coupled memory architectures to enable higher performance. For example, in 3D stacked memory architectures, low-latency memory may be associated with and located within a dedicated base address range, which may improve access times.

In accordance with examples as described herein, the system 200 may illustrate an example of a 3D stacked memory architecture such as coupled dynamic random access memory. As such, the memory die 240-1 and the memory die 240-2 may each include multiple memory arrays 250 which may be accessed by the host processor 210 (e.g., a host system, a processor of a host system) in a single data cycle. For example, the memory arrays 250 of the memory die 240-1 and the memory die 240-2 may store time-critical routines and data. In the case that the memory die 240-1 and the memory die 240-2 include an example of a 3D stacked memory architecture, the host processor 210 may access the routines and data stored in the banks arrays 250 within one data cycle rather than waiting for various fetch codes and processes external to the system.

Examples and techniques as described herein support implementation of memory interface blocks 220 that may serve as a common interface for 3D stacked memory architectures with the host processor 210. The memory interface blocks 220 may each be coupled with multiple memory dies 240, which may be stacked on the memory interface blocks 220. The memory interface blocks 220 may include controllers, datapath blocks, and interface blocks associated with each memory die 240 of the multiple memory dies 240. As such, the memory interface blocks 220 may perform functions such as queueing, executing ECC, and performing row repair and column repair procedures. In some examples, a layout for the memory interface blocks 220 may include pairing controllers for at least two memory dies 240, such that a pair of controllers may share a command port to a pair of memory dies 240. Further, the memory interface blocks 220 may include host interfaces 215 to the host processor 210 that are different than the interface to each memory die 240. For example, the host interface 215 may be synchronous, and may have independent channels for read and write operations, while the interface to each memory die 240 may be asynchronous and include channels that perform both read (e.g., access) and write operations. The layout of a memory interface block 220 is described in further detail herein, with reference to FIGS. 4 and 5. Accordingly, a layout for the system 200 including the memory interface blocks 220 may support an interface with 3D stacked memory architectures that may provide an increased capacity of low-latency memory.

FIG. 3A shows an example of a device 300-*a* that supports an interface layout for stacked memory architectures in accordance with examples as disclosed herein. The device 300-*a* may be an example of a device where an application-specific integrated circuit (ASIC) 305 (e.g., another integrated circuit, a die) is coupled with a memory device 310 using an interposer 315 (e.g., a silicon interposer, a glass interposer) and a package substrate 325. The device 300-*a* may be an example of the system 200 described with reference to FIG. 2. The ASIC 305 may be an example of the host processor 210 and other host devices described with reference to FIGS. 1 and 2. The device 300-*a* may include the memory interface blocks 335 and a physical interface 340, which may be included within a memory interface block as described herein. The memory device 310 may include one or more memory dies 320. The memory dies 320 may each be examples of the dies 240 or the memory arrays 250, as described with reference to FIG. 2. In some cases, the memory dies 320 may be referred to as memory arrays, arrays of memory cells, or decks of memory cells.

In some examples, for improved power usage and efficiency, the memory interface blocks 335 may be included in a buffer layer 330-*a* and coupled with the memory device 310 and the ASIC 305-*a*. For example, the memory interface blocks 335 may be included in the buffer layer 330-*a* between the memory device 310 and the interposer 315. The memory interface blocks 335 may be coupled with the ASIC 305-*a* via one or more physical interfaces 340, which may be physically connected via channels through the interposer 315. As described with reference to FIG. 2, the memory interface blocks 335 may assist in controlling the flow of commands and data between the ASIC 305-*a* and the memory dies 320 by providing temporary storage of and scheduling for commands received from the ASIC 305-*a* and designated for the memory device 310. One or more of the memory interface blocks 335 may receive commands from the ASIC 305-*a* (e.g., from a memory controller of the ASIC 305-*a*), may temporarily store the command in a memory bank managed by a shallow queue (e.g., a FIFO queue), and may subsequently determine when the command is to be sent to the memory device and via which channels (e.g., as described with reference to FIG. 2) the command is to be communicated.

In some examples, a layout for the memory interface blocks 335 may be selected based on a user input. For example, a user (e.g., a customer) may select a quantity of memory dies 320 desired for the device 300-*a*. The layout of the device 300-*a*, and the layout, size, quantity, or any combination thereof, of the memory interface blocks 335 may be based on the quantity of memory dies 320 (e.g., or a desired bandwidth or memory capacity), such that the memory interface blocks 335 may support the quantity of memory dies 320. The layouts of the memory interface blocks 335 are described in further detail herein, with reference to FIGS. 4 and 5.

FIG. 3B shows an example of a device 300-*b* that supports an interface layout for stacked memory architectures in accordance with examples as disclosed herein. The device 300-*b* may be an example of a device where an ASIC 305-*b* is coupled with a memory device 310 over a package substrate 325. The device 300-*b* may be similar to the device 300-*a*, except the ASIC 305-*b* of the device 300-*b* may be located between a buffer layer 330-*b* and the package substrate 325. As such, one or more memory interface blocks 335 and one or more physical interfaces 340 may be included within the buffer layer 330-*b* (e.g., as an interface shim) and may assist in controlling the flow of commands and data between the ASIC 305-*b* and one or more memory dies 320 of the memory device 310. This interface shim configuration may result in increased bandwidth and increased power efficiency of the device 300-*b*.

In some examples, a layout for the memory interface blocks 335 may be selected based on a user input. For example, a user (e.g., a customer) may select a quantity of memory dies 320 desired for the device 300-*b*. The layout of the device 300-*b*, and the layout, size, quantity, or any combination thereof, of the memory interface blocks 335 may be based on the quantity of memory dies 320 (e.g., or a desired bandwidth or memory capacity), such that the memory interface blocks 335 may support the quantity of memory dies 320. The layouts of the memory interface blocks 335 are described in further detail herein, with reference to FIGS. 4 and 5.

FIG. 3C shows an example of a device 300-*c* that supports an interface layout for stacked memory architectures in accordance with examples as disclosed herein. The device 300-*c* may be an example of a device where an ASIC 305-*c* is coupled with a memory device 310 over a package substrate 325. The device 300-*c* may be similar to the device 300-*b*, except that one or more memory interface blocks 335 and one or more physical interfaces 340 may be included in an ASIC 305-*c*. Additionally, the ASIC 305-*c* of the device 300-*b* may be located between the memory device 310 and the package substrate 325. As such, the one or more memory interface blocks 335 and the one or more physical interfaces 340 included in the ASIC 305-*c* may assist in controlling the flow of commands and data between the ASIC 305-*c* and one or more memory dies 320 of the memory device 310. This configuration of including the memory interface blocks 335 and the physical interfaces 340 into the ASIC 305-*c* may result in increased bandwidth, power efficiency, decreased latency, and high access speed of the device 300-*c*.

In some examples, a layout for the memory interface blocks 335 may be selected based on a user input. For example, a user (e.g., a customer) may select a quantity of memory dies 320 desired for the device 300-*c*. The layout of the device 300-*c*, and the layout, size, quantity, or any combination thereof, of the memory interface blocks 335 may be based on the quantity of memory dies 320 (e.g., or a desired bandwidth or memory capacity), such that the memory interface blocks 335 may support the quantity of memory dies 320. The layouts of the memory interface blocks 335 are described in further detail herein, with reference to FIGS. 4 and 5.

Figure 4:
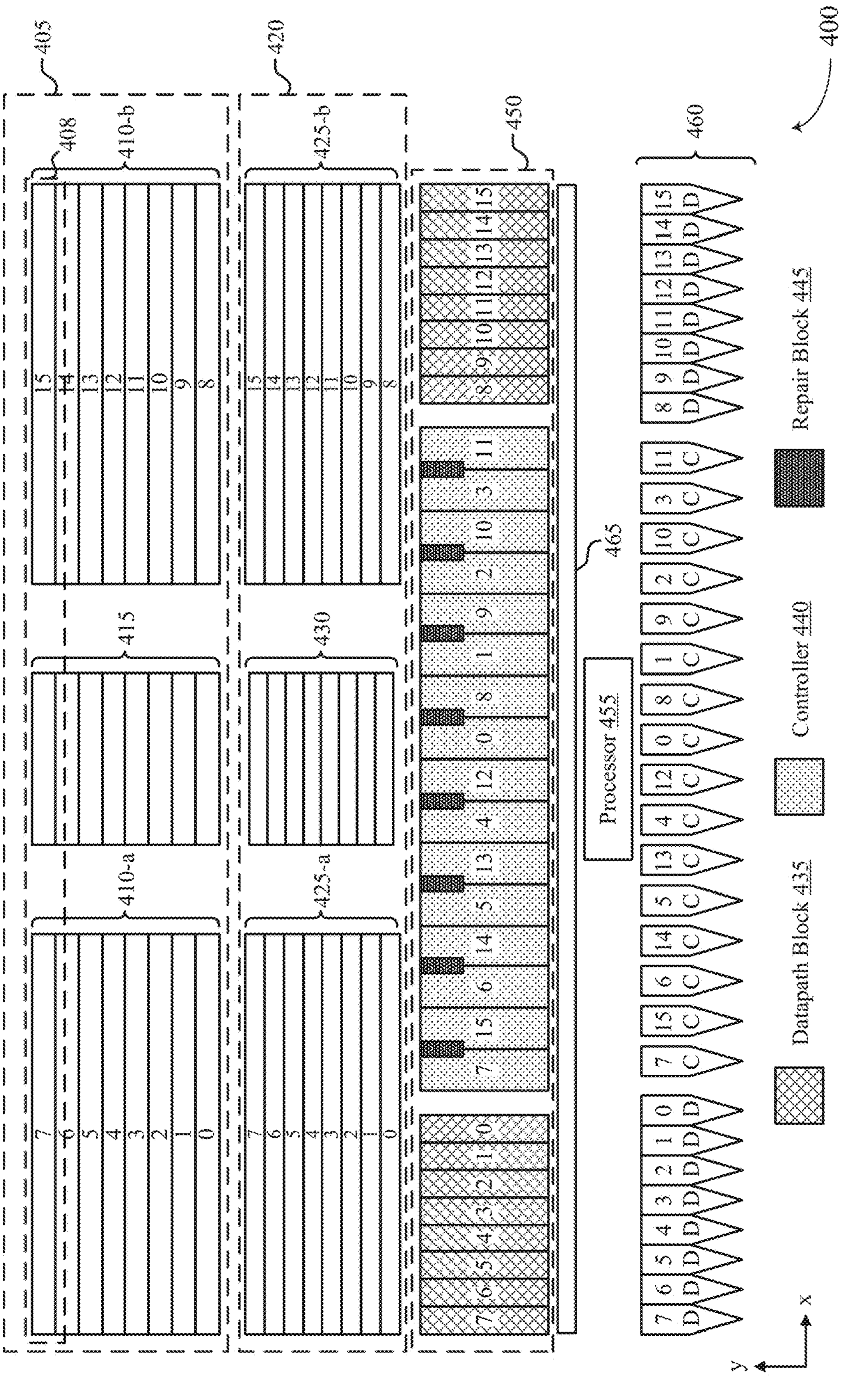
FIG. 4 shows an example of a system that supports an interface layout for stacked memory architectures in accordance with examples as disclosed herein.

FIG. 4 shows an example of a system 400 that supports an interface layout for stacked memory architectures in accordance with examples as disclosed herein. The system 400 may be an example of a memory interface block 220 or a memory interface block 335, as described herein with reference to FIGS. 1 through 3C. Further, the system 400 may serve as an interface between a plurality of memory dies (e.g., the memory dies 320, as described herein with reference to FIGS. 3A through 3C) and a host system (e.g., the host system 105, the host processor 210, an ASIC 305, or any combination thereof, as described herein with reference to FIGS. 1 through 3C).

In some examples, the system 400 may include a section 405 corresponding to a plurality of interface blocks that may contain contacts (e.g., ports, interfaces) for through-silicon-vias associated with a plurality of memory dies. For example, the section 405 may include a set of contacts 410-*a* for through-silicon-vias corresponding to a first subset of memory dies of the plurality of memory dies, and the section 405 may also include a set of contacts 410-*b* for one or more through-silicon-vias corresponding to a second subset of memory dies of the plurality of memory dies. Each set of contacts 410 may be arranged as one or more rows of contacts, which may form a stack. For example, the set of contacts 410-*a* may include eight rows of contacts, and each row of contacts may correspond to a memory die of the first subset of memory dies. The rows of contacts may be arranged along a second dimension (e.g., the y-direction). The quantity of contacts per set of contacts 410 may be variable, however, and may be adjusted based on a quantity of memory dies to be supported by the system 400, as described in more detail with reference to FIG. 5. In this example, the system 400 may be arranged to support 16 memory dies, for example.

In some examples, the section 405 may include a set of contacts 415, which may include one or more rows of command contacts (e.g., interface blocks, rows of command ports) associated with receiving commands for the plurality of memory dies. In some examples, the set of contacts 410-*a* and the set of contacts 410-*b* may be arranged on either side of the set of contacts 415. This may allow for each row of command contacts of the set of contacts 415 to correspond to two memory dies, one for each subset of memory dies. For example, the bottom-most row of command contacts of the set of contacts 415 may be associated with receiving commands for both a first memory die of the first subset of memory dies (e.g., associated with the row of contacts with index 0 of the set of contacts 410-*a*) and a first memory die of the second subset of memory dies (e.g., associated with the row of contacts with index 8 of the set of contacts 410-*b*). Further, a top-most row of command contacts of the set of contacts 415 may be associated with receiving commands for both a last memory die of the first subset of memory dies (e.g., associated with a row of contacts with index 7 of the set of contacts 410-*a*) and a last memory die of the second subset of memory dies (e.g., associated with a row of contacts with index 15 of the set of contacts 410-*b*), and similarly for other rows of command contacts of the set of contacts 415.

As such, the quantity of rows of command contacts of the set of contacts 415 may correspond to the quantity of rows of contacts in each of the set of contacts 410-*a* and the set of contacts 410-*b* (e.g., eight, in this case), which may support receiving commands for each of the plurality of memory dies (e.g., 16, in this case). Further, as each row of contacts of the set of contacts 415 is common to two memory dies, the layout of the system 400 may be of a smaller size.

The set of contacts 410-*a*, the set of contacts 410-*b*, and the set of contacts 415 may be arranged in multiple contact blocks 408, where each contact block 408 may include a subset of the set of contacts 410-*a* (e.g., configured for communication of data with a first memory die), a subset of the set of contacts 410-*b* (e.g., configured for communication of data with a second memory die), and a subset of the set of contacts 415 (e.g., configured for communication of commands with both the first memory die and the second memory die associated with the subsets of the set of contacts 410-*a* and the set of contacts 410-*b*).

The system 400 may include a section 420, which may include drivers (e.g., transmitter circuitry, receiver circuitry, interfaces, ports) for sending or receiving read data, write data, and commands to and from the plurality of memory dies via the contacts of the section 405. For example, the set of contacts 410-*a* and the set of contacts 410-*b* may be coupled with a set of drivers 425-*a* and a set of drivers 425-*b*, respectively, associated with receiving and sending data. Similarly, the set of contacts 415 may be coupled with a set of drivers 430 associated with receiving and sending commands, and the set of drivers 430 may include one or more rows of command drivers (e.g., command ports).

In some examples, the set of drivers 425-*a* may include a row of drivers (e.g., a row of one or more drivers, ports) coupled with a corresponding row of contacts in the set of contacts 410-*a*. For example, the row of drivers with an index of 0 may communicate (e.g., send and receive) data with the first memory die of the first subset of memory dies via the row of contacts with an index of 0 of the set of contacts 410-*a*. Similarly, the row of drivers with an index of 8 of the set of drivers 425-*b* may communicate data with the first memory die of the second subset of memory dies based on being coupled with a corresponding row of contacts with an index of 8 of the set of contacts 410-*b*, and so on for other rows of drivers of the set of drivers 425-*a* and the set of drivers 425-*b*.

In some examples, the set of drivers 430 may be ordered such that each row of command drivers is coupled with a corresponding row of command contacts of the set of contacts 415 (e.g., bottom-most row of command drivers corresponds to bottom-most row of command contacts, and so on). As such, each row of command drivers may communicate commands to a respective row of command contacts. Accordingly, each row of command drivers may also be common to two memory dies, one memory die of each subset of memory dies. By sharing the use of the set of drivers 430 and the set of contacts 415, the system 400 may be reduced in size while still supporting interface operations between a large quantity of memory dies and a host device.

In some examples, the system 400 may include a plurality of datapath blocks 435 corresponding to the plurality of memory dies. Each datapath block 435 may receive data directed from or to a respective memory die of the plurality of memory dies. The datapath blocks 435 may be arranged such that a first subset of the datapath blocks 435 corresponding to the first subset of memory dies is located in a first area of a section 450 of the system 400, and a second subset of the datapath blocks 435 corresponding to the second subset of memory dies is located in a second area of the section 450, as illustrated. This may facilitate routing between the datapath blocks 435 and corresponding rows of drivers (e.g., with a same index value) of the set of drivers 425-*a* and the set of drivers 425-*b*. For example, datapath blocks 435 with index values between 0 and 7 may be located in an area of the section 450 near the set of drivers 425-*a*, while datapath blocks 435 with index values between 8 and 15 may be located in an area of the section 450 near the set of drivers 425-*b*.

In some cases, the size (e.g., aspect ratio), positioning (e.g., horizontal or vertical orientation, relative to other components such as a set of drivers 425), or both, of the datapath blocks 435 may be based on the quantity of the plurality of memory dies. For example, the datapath blocks 435 may be arranged along a first dimension (e.g., the x-direction), as illustrated with reference to FIG. 4. Similarly, the size and positioning of other components may also be based on the quantity of memory dies, as described in more detail with reference to FIG. 5.

In some cases, the datapath blocks 435 may be configured to perform error correction procedures. For example, each datapath block 435 may be configured to generate ECC and execute the ECC for an error correction procedure on a corresponding memory die. The ECC bits generated by the datapath block 435 may be stored with the data at the memory die. The datapath block 435 may then execute the ECC process for read operations to check the data read from the memory die using the associated ECC and correct bit errors before passing the data to the host device via an interface block 460. By executing ECC at the datapath blocks 435, the system 400 may support performing error correction procedures concurrently with other operations. For example, error correction procedures for a memory may be performed during a same occasion as other operations at the memory die, such as execution of commands, data read operations, or data write operations. Additionally, or alternatively, executing ECC at a datapath block 435 may allow for ECC to be performed according to a smaller feature size (e.g., a complementary metal-oxide-semiconductor (CMOS) feature size), relative to executing ECC at a memory die. Further, by performing error correction at the datapath blocks 435, each memory die may be reduced in size by omitting components that would perform error correction at the memory dies.

In some examples, the system 400 may include a plurality of controllers 440 associated with receiving commands from the host device and performing control operations. For example, the controllers 440 may be involved in scheduling across memory banks, such as scheduling row and column commands, monitoring timings associated with the plurality of memory dies (e.g., DRAM timings, column address strobe (CAS) timings), mapping logical address to physical addresses associated with the plurality of memory dies, performing column repair and row repair procedures, or any combination thereof. In some examples, the system 400 may include a controller 440 for each of the plurality of memory dies, and the controllers 440 may be located within the section 450, between the first subset of the datapath blocks 435 corresponding to the first subset of memory dies and the second subset of the datapath blocks 435 corresponding to the second subset of memory dies.

Due to the shared nature of the set of contacts 415 and the set of drivers 430, to process and receive commands for both memory dies, each row of command drivers of the set of drivers 430 may be common to a pair of two controllers 440. For instance, the bottom-most row of command drivers may be coupled with the controller 440 with index 0 and the controller 440 with index 8, which may correspond to the first memory die of the first subset of memory dies and the first memory die of the second subset of memory dies, respectively. The next row of drivers (e.g., the second from the bottom) may be coupled with the controller 440 with index 1 and the controller 440 with index 9, which may correspond to a second memory die of the first subset of memory dies and a second memory die of the second subset of memory dies, respectively, and so on. As such, each respective row of drivers of the set of drivers 430 may be coupled with a respective pair of controllers 440, where one controller 440 of the pair corresponds to a memory die of the first subset of memory dies and the other controller 440 of the pair corresponds to a memory die of the second subset of memory dies. For example, for respective rows of drivers increasing from bottom to top (e.g., in the positive y-direction), the index of each controller 440 of a respective pair of controllers 440 will increase by one, with the bottom row of drivers beginning with a pair of controllers 440 with indexes 0 and 8 and the top row of drivers ending with a pair of controllers 440 with indexes 7 and 15.

To facilitate routing each row of drivers of the set of drivers 430 with two controllers 440 of the corresponding memory dies, the controllers 440 may be arranged in an alternating fashion, as illustrated in FIG. 4. For example, each controller 440 that is configured to receive commands for a memory die of the first subset of memory dies may be adjacent to a controller 440 that is configured to receive commands for a memory die of the second subset of memory dies, and vice-versa. As such, the controllers 440 may form an interleaving pattern between controllers associated with the first subset of memory dies and controllers associated with the second subset of memory dies.

The layout for pairs of controllers (e.g., each pair corresponding to a respective row of drivers of the set of drivers 430) may also be arranged to facilitate routing. For example, and as illustrated, four pairs of controllers 440 corresponding to the top four rows of drivers of the set of drivers 430 are arranged in descending order (e.g., pair of controllers 440 with indexes 7-15, followed by indexes 6-14, indexes 5-13, and indexes 4-12), which may reduce crossing of routes for coupling with the corresponding top four rows of drivers. Following these pairs of controllers, four additional pairs of controllers 440 corresponding to the bottom four rows of drivers of the set of drivers 430 are arranged in ascending order (e.g., pair of controllers 440 with indexes 0-8, followed by indexes 1-9, indexes 2-10, and indexes 3-11), which may reduce crossing of routes for coupling with the corresponding bottom four rows of drivers. The pairing of controllers 440 may be based on the quantity of each subset of memory dies. For example, for a quantity N of memory dies per subset of memory dies (e.g., 2N total memory dies), a first pair of controllers 440 may have indexes 0 and N, and these may increase by 1 for each respective pair of controllers 440 until all memory dies have a corresponding controller 440 (e.g., controllers 440 with indexes N−1 and 2N−1). In some cases, the first pair of controllers 440 and a second pair of controllers associated with indexes N/2 and 3N/2 may be adjacent to a center of the section 450, and the indices may increase by one for each pair of controllers extending out (e.g., in the x-direction) from the pairs of controllers adjacent to the center.

In some cases, the set of drivers 430 may be associated with one or more bits (e.g., pseudo-channel bits) that may control which controller 440 of a pair of controllers 440 will be coupled with a corresponding memory die, or which commands queued from the pair of controllers 440 will be performed. For example, for the bottom-most row of drivers, the one or more bits may be set to a first value that indicates for commands to be transmitted to the first memory die of the first subset of memory dies associated with the controller 440 with an index of 0. Alternatively, the one or more bits may be set to a second value that indicates for commands to be transmitted to the first memory die of the first subset of memory dies associated with the controller 440 with an index of 8. In some examples, arbitration of the pseudo-channel bits may be based on a multiple access scheme such as a clock cycle dependent access, or may be based on a priority of operations (e.g., read operations may be prioritized over write operations, or commands received earlier may be prioritized). In some cases, each row of command drivers may be associated with a respective bit to select which controller 440 of the corresponding pair of controllers 440 will be coupled. As such, the set of drivers 430 may support receiving and sending commands to both the first subset of memory dies and the second subset of memory dies.

In some examples, the system 400 may include a set of repair blocks 445, and each repair block 445 may be common to and shared by a pair of controllers 440. For example, a single repair block 445 may be associated with performing repair operations (e.g., column repair and row repair operations) for a pair of memory dies that correspond to the pair of controllers (e.g., a memory die of the first subset of memory dies and a memory die of the second subset of memory dies). In some cases, the set of repair blocks 445 may be configured to perform address swapping based on repair data received from fuses of a first set of fuses associated with the first subset of memory dies and a second set of fuses associated with the second subset of memory dies. In some examples, a fuse may store repair data associated with a single memory die. Alternatively, there may be an overall set of fuses, and subsets of fuses of the overall set may store data for a pair of memory dies (e.g., the first memory die of the first subset of memory dies and the first memory die of the second subset of memory dies). A repair block 445 may, in some examples, store repair data received in a memory array (e.g., a volatile memory array, such as SRAM array) of the repair block 445. By sharing repair blocks 445 between pairs of controllers 440, the system 400 may be smaller in size, such as by decreasing the quantity repair blocks 445 and memory arrays associated with the repair blocks 445.

To perform address swapping, a repair block 445, as part of a row repair procedure, may redirect a row address from a first row of a memory die of the plurality of memory dies to a second row of the memory die based on the repair data received via a fuse. Additionally, or alternatively, the repair block 445 may perform address swapping as part of a column repair procedure, which may involve redirecting a column address from a first column of a memory die of the plurality of memory dies to a second column of the memory die based on the repair data received via a fuse. In some cases, a column repair procedure may include replacing a data channel for a memory die. For example, a repair block 445 may be configured to swap a data channel (e.g., a faulty data channel) for a corresponding memory die to another data channel (e.g., a spare data channel). Accordingly, each repair block 445 may perform row repair procedures and column repair procedures for at least two memory dies (e.g., a memory die of the first subset of memory dies, and a memory die of the second subset of memory dies).

In some examples, the system 400 may include a processor 455 (e.g., a built-in self-test processor). The processor 455 may be coupled with each of the controllers 440 and may be operable to perform procedures to test each memory die (e.g., through a corresponding controller 440) by issuing commands associated with a test procedure (e.g., performed in manufacturing testing). In some examples, the processor 455 may additionally, or alternatively, initiate or aid in performing row repair procedures and column repair procedures (e.g., via the repair blocks 445), such as by storing or providing logic associated with row repair and column repair procedures. In some examples, the processor 455 may additionally receive the repair data from the first set of fuses and the second set of fuses and may initiate row repair procedures or column repair procedures (e.g., via a corresponding repair block 445) based on the repair data. For example, the processor 455 may send commands received from a host device to the corresponding repair block 445, and the repair block 445 may perform queueing of received commands and execute the commands via a controller 440 of the corresponding pair of controllers 440 that matches the memory die associated with the command. Additionally, or alternatively, a processor 455 may indicate a repair block 445 to read fuse data (e.g., repair data stored in one or more fuses) associated with a corresponding memory die. In some cases, the processor 455 may additionally, or alternatively, perform a boot procedure associated with the system 400, and may perform operations associated with the boot procedure for each memory die of the plurality of memory dies, which may include clearing or initializing queues (e.g., command queues) or buffers (e.g., data buffers).

In some examples, the system 400 may include a plurality interface blocks 460 for interfacing with (e.g., receiving and sending data and commands to) the host device. For example, interface blocks 460 denoted with the letter 'D' may be referred to as data interface blocks 460 for receiving or sending data from the host device, while interface blocks 460 denoted with the letter 'C' may be referred to as command interface blocks 460 for receiving commands from the host device. Each data interface block 460 may be coupled with a respective datapath block 435, while each command interface block 460 may be coupled with a respective controller 440. The plurality of interface blocks 460 may therefore be arranged in such a way to facilitate coupling with the corresponding datapath blocks 435 or controllers 440 and may be relatively aligned with the corresponding components.

In some cases, the datapath blocks 435 and the controllers 440 may receive or send data and commands to or from the corresponding interface blocks 460 via a set of multiplexers 465. For example, the set of multiplexers 465 may be operable to route incoming or outgoing data from an interface block 460 to a corresponding controller 440 or datapath block 435. In some cases, the processor 455 may be located between the multiplexers 465 and the plurality of interface block 460, which may facilitate operations (e.g., boot procedures, test operations, repair operations) performed by the processor 455 that may involve receiving data from a host device.

Figure 5:
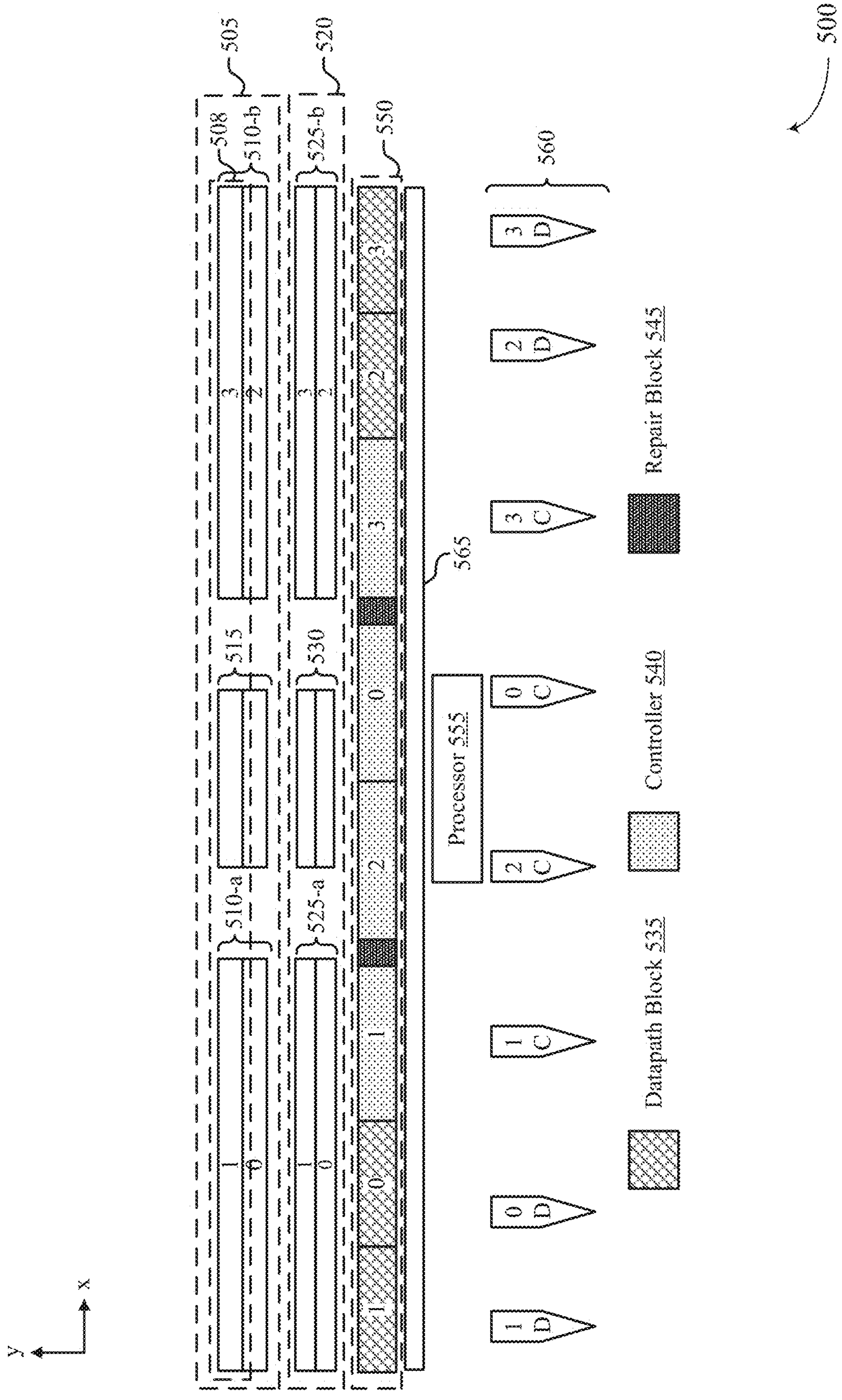
FIG. 5 shows an example of a system that supports an interface layout for stacked memory architectures in accordance with examples as disclosed herein.

FIG. 5 shows an example of a system 500 that supports an interface layout for stacked memory architectures in accordance with examples as disclosed herein. The system 400 may serve as an interface between a plurality of memory dies (e.g., the memory dies 320, as described herein with reference to FIGS. 3A through 3C) and a host system (e.g., the host system 105, the host processor 210, an ASIC 305, or any combination thereof, as described herein with reference to FIGS. 1 through 3C). Further, the system 500 may be an example of the system 400, as described herein with reference to FIG. 4. For example, the system 500 may include a set of contacts 510-*a*, a set of contacts 510-*b*, and a set of contacts 515, within a section 505 and arranged into contact blocks 508, a set of drivers 525-*a*, a set of drivers 525-*b*, and a set of drivers 530, within a section 520, datapath blocks 535, controllers 540, and repair blocks 545, within a section 550, a processor 555, interface blocks 560, and multiplexers 565, which may be examples of corresponding components as described herein, with reference to FIG. 4.

The system 500 may illustrate a memory interface block for a smaller quantity of memory dies than the system 400. For example, the layout of the system 500 may be adjusted according to a set of parameters, which may include a memory bandwidth (e.g., size), a device size, a quantity of memory dies, or any combination thereof. In this example, the system 500 may be laid out to support four memory dies.

As such, the quantities of components of the system 500 may be based on the quantity of four supported memory dies. For example, the quantities of datapath blocks 535 and controllers 540 may be equal to the quantity of memory dies supported by the system 500. Similarly, the quantities of other components may be adjusted accordingly, as illustrated.

In some examples, some dimensions of the section 505 and the section 520 may be independent of the set of parameters. For example, a dimension (e.g., along an x-dimension) of the section 505 and the section 520 may be independent of the set of parameters and may be common between the system 500 and the system 400, regardless of the quantity of supported memory dies. Similarly, a size of the interface blocks 560 may also be independent of the set of parameters. In some cases, the interface blocks 560 may be spread out to cover the area of the system 500 along the x-dimension, as shown.

In some examples, some components of the system 500 may be dependent on the set of parameters. For example, the section 550 may have a dimension that is independent of the set of parameters (e.g., along the x-dimension) and may be the same as the dimension of the section 505 and the section 520. However, the repair blocks 545, the controllers 540 and the datapath blocks 535 may be sized to fit within the section 550. As such a first dimension (e.g., along the x-dimension) of the repair blocks 545, the controller 540, and the datapath blocks 535 may be based on the length of the section 550 along the x-dimension, which may be based on the length along the x-dimension of the section 505 and the section 520. Further, a length along a y-dimension of the datapath blocks 535 may be based on the quantity of datapath blocks 535. Similarly, a length along the y-dimension of the controllers 540 may be based on the quantity of controllers 540, and a length along the y-dimension of the repair blocks 545 may be based on the quantity of repair blocks 545.

As such, a layout for the system 500 may be generated according to the set of parameters, which may include a quantity of memory dies, and components of the system 500 may be resized accordingly, such that aspect ratios of one or more of the components varies based on a quantity of the components. This may result in providing a standard or independent first dimension (e.g., a width dimension) for the system 500, while modifying a second dimension (e.g., a height dimension) based on a quantity of memory dies to be supported.

Figure 6:
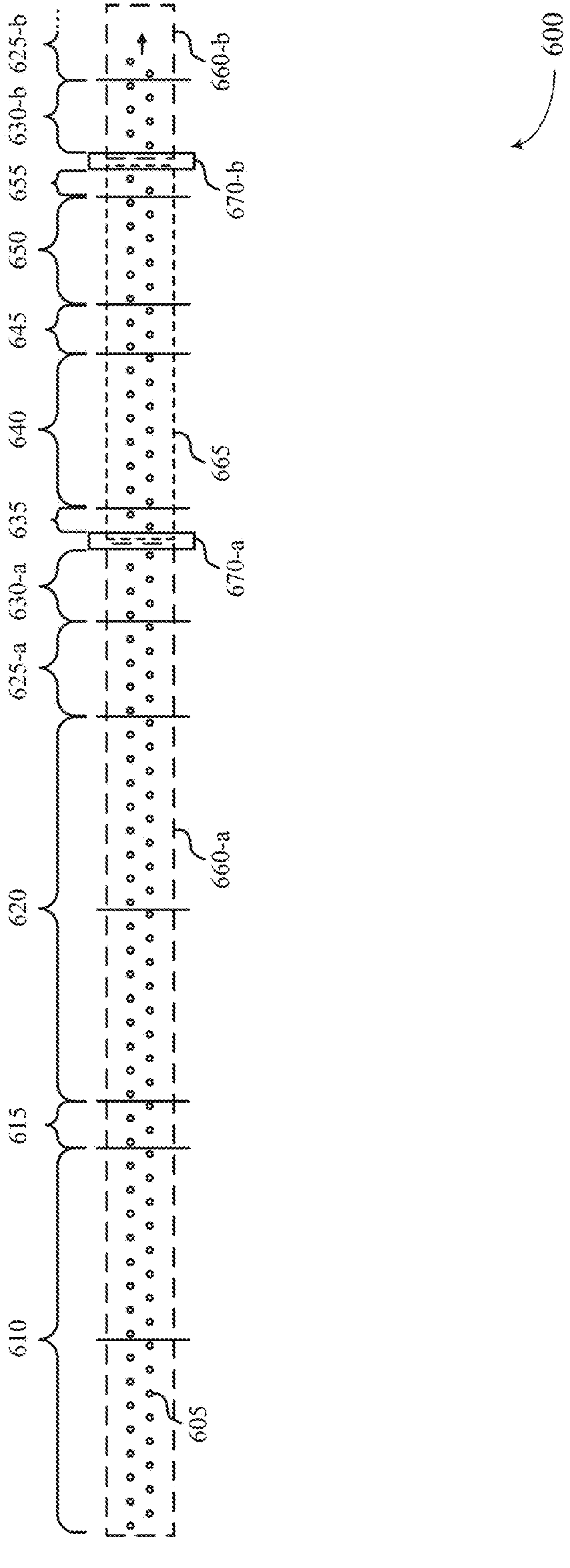
FIG. 6 shows an example of a contact layout that supports an interface layout for stacked memory architectures in accordance with examples as disclosed herein.

FIG. 6 shows an example of a contact layout 600 that supports an interface layout for stacked memory architectures in accordance with examples as disclosed herein. The contact layout 600 may illustrate a positioning of contacts 605 for through-silicon-vias, such as the sets of contacts 410, the set of contacts 415, the sets of contacts 510, and the set of contacts 515 as described in reference to FIGS. 4 and 5. In some cases, the contact layout 600 may include multiple lines of contacts 605 (e.g., two lines), and contacts 605 within the lines of contacts 605 may be staggered, as illustrated in FIG. 6.

Some contacts 605 may be associated with transmitting (e.g., receiving or sending) data to or from a memory die, and other contacts 605 may be associated with transmitting commands to or from a memory die. For example, contacts 605 located within a region 660-*a* may be data contacts 605 for a first memory die and may correspond to contacts 605 within a single row of contacts of a set of contacts 410-*a*, as described herein with reference to FIG. 4. Additionally, contacts 605 located within a region 665 may be command contacts 605 and may correspond to contacts within a single row of contacts of a set of contacts 415, as described herein with reference to FIG. 4. Further, contacts 605 located within a region 660-*b* may be data contacts 605 for a second memory die and may correspond to contacts 605 within a single row of contacts of a set of contacts 410-*b*, as described herein with reference to FIG. 4.

Within the region 660-*a*, the contact layout 600 may include a section 610 that contains data in or out contacts 605 (e.g., input/output, DQ contacts). The contacts 605 within this section may have indexes numbering from a value of 0 to a value of 31 and, in some examples, may be divided into two sections of 16 contacts 605. In some examples, contacts 605 within a section 615 may be associated with read data strobe (e.g., RDQS). In some cases, two contacts 605 of the section 615 may be for a read data strobe signal, and another two may be spare contacts 605 (e.g., in case a contact 605 for the read data strobe signal fails). In some examples, a section 620 may contain additional data in or out contacts 605 (e.g., input/output, DQ contacts). The contacts 605 within the section 620 may have indexes numbering from a value of 32 to a value of 63 and, in some examples, may be divided into two sections of 16 contacts 605. In some examples, a section 625-*a* may contain contacts 605 associated with data transfer for ECC procedures, and a section 630-*a* may contain spare data in or out contacts 605. In some cases, two of the contacts 605 within the section 630-*a*, such as the two closest to a routing section 670-*a*, may be unused (e.g., may be spare contacts for spare data channels).

Within the region 665 corresponding to command contacts 605, the contact layout 600 may include a section 635 that contains two contacts 605 associated with row hammer alert (e.g., an alert associated with mitigating row hammer attacks). In some examples, a section 640 may include contacts 605 (e.g., 12 contacts) associated with communicating row commands to a memory die. A section 645 may include contacts 605 related to clock timings. In some cases, two contacts 605 may be associated with a clock signal, and two may be spare contacts 605 (e.g., in case the two contacts 605 associated with the clock signal fail). A section 650 may include contacts 605 (e.g., 8 contacts) associated with communicating column commands to a memory die. In some examples, a section 655 may contain another two contacts 605 associated with row hammer alert.

In some examples, the contacts 605 within the region 660-*b* may be arranged in a manner that mirrors the arrangement of contacts 605 within the region 660-*a*, separated by a routing section 670-*b*. For example, contacts 605 within the section 630-*b* may mirror the arrangement of contacts 605 within the section 630-*a*, contacts within the section 625-*b* may mirror the arrangement of contacts within the section 625-*a*, and so on.

Figure 7:
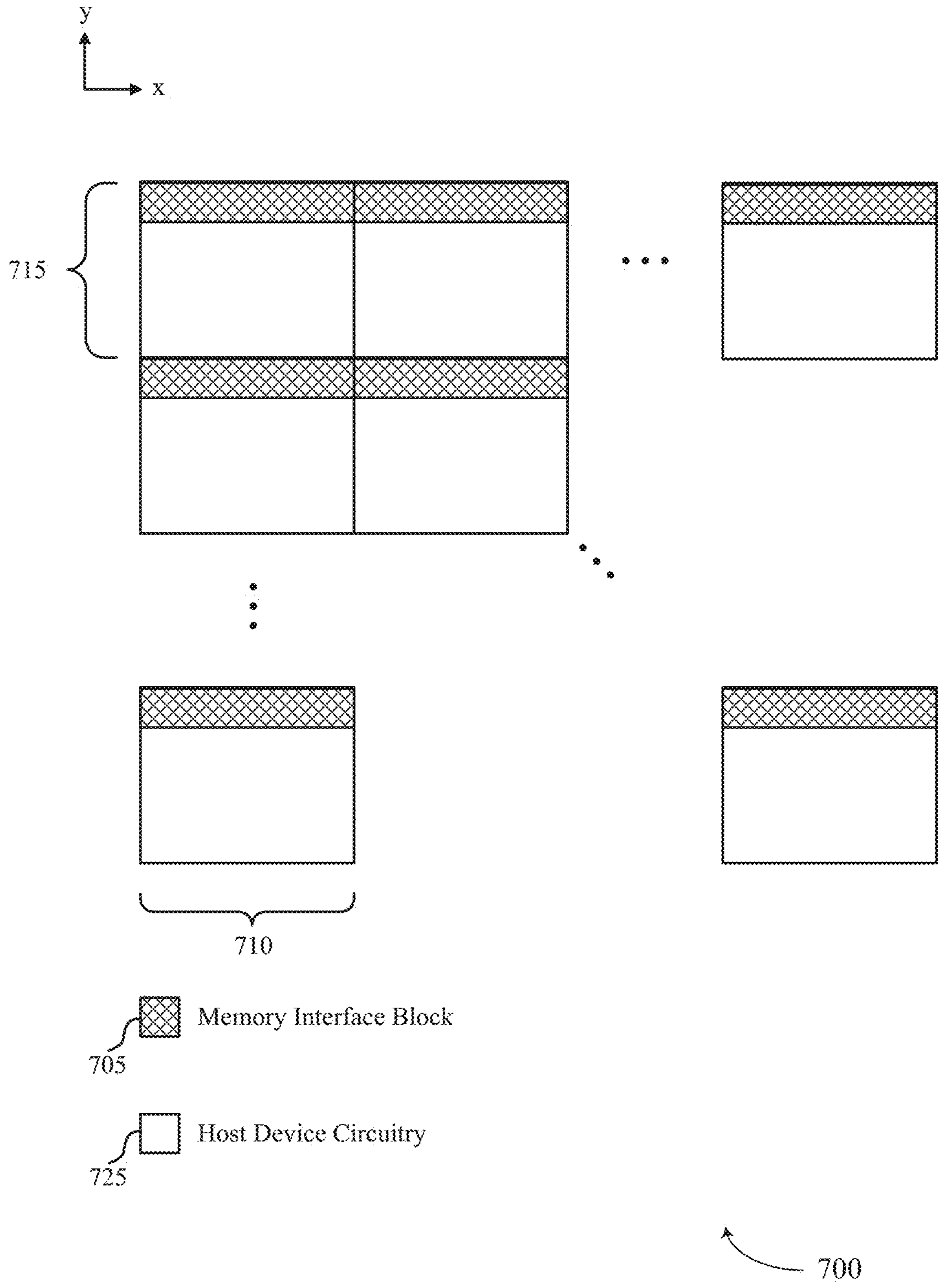
FIG. 7 shows an example of a spacing layout that supports an interface layout for stacked memory architectures in accordance with examples as disclosed herein.

FIG. 7 shows a system layout 700 that supports an interface layout for stacked memory architectures in accordance with examples as disclosed herein. The system layout 700 illustrates spacing between multiple memory interface blocks 705, which may be examples of a memory interface block 220, a memory interface block 335, the system 400, or the system 500, as described herein with reference to FIGS. 2-5.

A memory system may include multiple memory interface blocks 705. In some examples, the memory interface blocks 705 may be spaced based on a pitch between memory interface blocks 705 and other components. For example, memory interface blocks 705 may be spaced based on a pitch 710 in an x-direction. Similarly, memory interface blocks 705 may be spaced from other components based on a pitch 715 in a y-direction. For example, multiple memory dies may be stacked on top of a substrate including the memory interface blocks 705 and additional circuitry (e.g., host device circuitry 725). The size of memory interface blocks 705 may be variable (e.g., as described herein with reference to FIG. 5), while retaining an overall layout for a memory device. For example, memory interface blocks 705 may increase in size (e.g., in the y-direction) to support a larger quantity of memory dies. The memory interface blocks 705 may still fit within the pitch 715, and the overall layout may be preserved, while still allowing for memory interface blocks 705 of different sizes to support different quantities of memory die.

Figure 8:
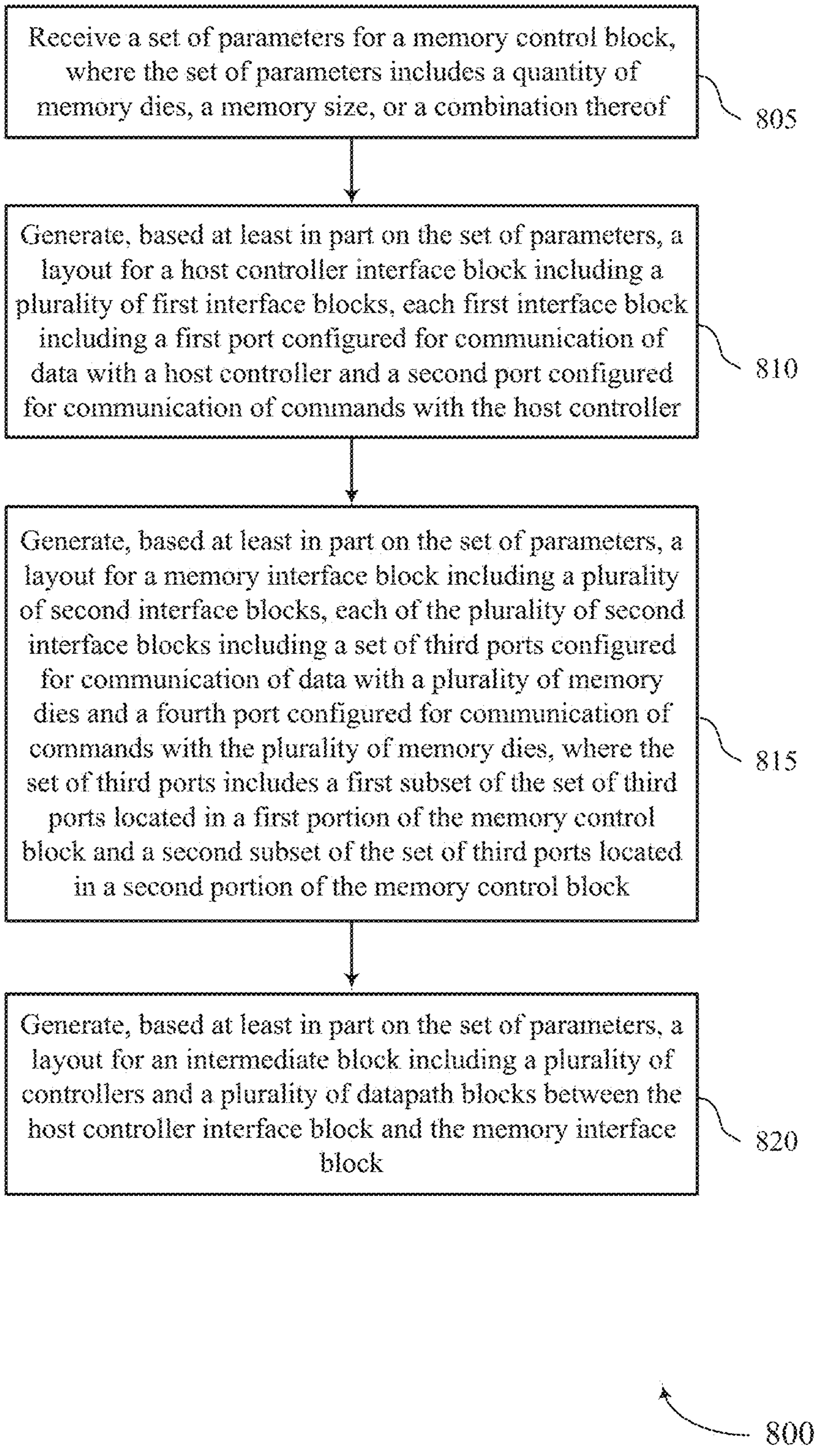
FIG. 8 shows a flowchart illustrating a method or methods that support an interface layout for stacked memory architectures in accordance with examples as disclosed herein.

FIG. 8 shows a flowchart illustrating a method 800 that supports an interface layout for stacked memory architectures in accordance with examples as disclosed herein. The operations of method 800 may be implemented by a manufacturing system or its components as described herein. For example, the operations of method 800 may be performed by a manufacturing system as described with reference to FIGS. 1 through 6. In some examples, a manufacturing system may execute a set of instructions to control the functional elements of the device to perform the described functions. Additionally, or alternatively, the manufacturing system may perform aspects of the described functions using special-purpose hardware.

At 805, the method may include receiving a set of parameters for a memory interface block (e.g., a memory interface block 220, a memory interface block 335, a memory interface block 705), where the set of parameters includes a quantity of memory dies, a memory size, or a combination thereof. The operations of 805 may be performed in accordance with examples as disclosed herein.

At 810, the method may include generating, based at least in part on the set of parameters, a layout for a host controller interface block including a plurality of interface blocks (e.g., interface blocks 460, interface blocks 560), each interface block including a first port (e.g., a data interface block 460, a data interface block 560) configured for communication of data with a host controller and a second port (e.g., a command interface block 460, a command interface block 560) configured for communication of commands with the host controller. The operations of 810 may be performed in accordance with examples as disclosed herein.

At 815, the method may include generating, based at least in part on the set of parameters, a layout for a memory interface block including a plurality of contact blocks (e.g., contact blocks 408, contact blocks 508), each of the plurality of contact blocks including a set of third ports (e.g., a subset of a set of contacts 410, a subset of a set of contacts 510) configured for communication of data with a plurality of memory dies and a fourth port (e.g., a subset of a set of contacts 415, a subset of a set of contacts 515) configured for communication of commands with the plurality of memory dies, where the set of third ports includes a first subset of the set of third ports located in a first portion of the memory interface block and a second subset of the set of third ports located in a second portion of the memory interface block. The operations of 815 may be performed in accordance with examples as disclosed herein.

At 820, the method may include generating, based at least in part on the set of parameters, a layout for an intermediate block including a plurality of controllers (e.g., controllers 440, controllers 540) and a plurality of datapath blocks (e.g., datapath blocks 435, datapath blocks 535) between the host controller interface block and the memory interface block. The operations of 820 may be performed in accordance with examples as disclosed herein.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a set of parameters for a memory interface block, where the set of parameters includes a quantity of memory dies, a memory size, or a combination thereof; generating, based at least in part on the set of parameters, a layout for a host controller interface block including a plurality of interface blocks, each interface block including a first port configured for communication of data with a host controller and a second port configured for communication of commands with the host controller; generating, based at least in part on the set of parameters, a layout for a memory interface block including a plurality of contact blocks, each of the plurality of contact blocks including a set of third ports configured for communication of data with a plurality of memory dies and a fourth port configured for communication of commands with the plurality of memory dies, where the set of third ports includes a first subset of the set of third ports located in a first portion of the memory interface block and a second subset of the set of third ports located in a second portion of the memory interface block; and generating, based at least in part on the set of parameters, a layout for an intermediate block including a plurality of controllers and a plurality of datapath blocks between the host controller interface block and the memory interface block.

Aspect 2: The method, apparatus, or non-transitory computer-readable medium of aspect 1, where generating the layout for the intermediate block further includes operations, features, circuitry, logic, means, or instructions, or any combination thereof for generating the intermediate block based on a first dimension and a second dimension, where the first dimension is based on the set of parameters and the second dimension is independent of the set of parameters.

Aspect 3: The method, apparatus, or non-transitory computer-readable medium of aspect 2, where a quantity of the plurality of controllers is based on the set of parameters, a quantity of the plurality of datapath blocks is based on the set of parameters, and generating the layout for the intermediate block further includes operations, features, circuitry, logic, means, or instructions, or any combination thereof for generating each controller of the plurality of controllers based on the first dimension and a third dimension, the third dimension based on the quantity of the plurality of controllers and generating each datapath block of the plurality of datapath blocks based on the first dimension and a fourth dimension, the fourth dimension based on the quantity of the plurality of datapath blocks.

Aspect 4: The method, apparatus, or non-transitory computer-readable medium of any of aspects 1 through 3, where the fourth ports are located in a third portion of the memory interface block, the third portion of the memory interface block located in between and adjacent to the first portion of the memory interface block and the second portion of the memory interface block.

Aspect 5: The method, apparatus, or non-transitory computer-readable medium of any of aspects 1 through 4, where the plurality of datapath blocks includes a first subset of the plurality of datapath blocks located in a first portion of the intermediate block and a second subset of the plurality of datapath blocks located in a second portion of the intermediate block and the plurality of controllers is located in a third portion of the intermediate block, the third portion of the intermediate block located in between and adjacent to the first portion of the intermediate block and the second portion of the intermediate block.

Aspect 6: The method, apparatus, or non-transitory computer-readable medium of any of aspects 1 through 5, where a first subset of the plurality of controllers is configured for communication of commands with a first subset of the plurality of memory dies and a second subset of the plurality of controllers is configured for communication of commands with a second subset of the plurality of memory dies, each controller of the first subset of the plurality of controllers being adjacent to a respective controller of the second subset of the plurality of controllers and forming an interleaving pattern.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 7: An apparatus, including: a plurality of interface blocks, each of the plurality of interface blocks including a first port configured for communication of data with a host controller and a second port configured for communication of commands with the host controller; a first set of controllers, each controller of the first set of controllers coupled with one of a first subset of the plurality of interface blocks; a second set of controllers, each controller of the second set of controllers coupled with one of a second subset of the plurality of interface blocks; and a plurality of contact blocks, each of the plurality of contact blocks including a set of third ports configured for communication of data with a plurality of memory dies and a fourth port configured for communication of commands with the plurality of memory dies, where, for each of the plurality of contact blocks, each third port of the set of third ports is coupled with one of the first set of controllers or one of the second set of controllers, and each of the fourth ports are common to the one of the first set of controllers and the one of the second set of controllers.

Aspect 8: The apparatus of aspect 7, where each of the plurality of contact blocks is operable to couple a respective controller of the first set of controllers with a respective first memory die of the plurality of memory dies via the fourth port and a respective third port of the set of third ports.

Aspect 9: The apparatus of aspect 8, where each of the plurality of contact blocks is operable to couple a respective controller of the second set of controllers with a respective second memory die of the plurality of memory dies via the fourth port and a respective third port of the set of third ports, the respective second memory die different from the respective first memory die.

Aspect 10: The apparatus of aspect 9, where coupling a first controller with a first memory die of a first subset of the plurality of memory dies via a fourth port of the fourth ports is based on a first bit associated with the fourth port including a first value, and coupling a second controller with a second memory die of a second subset of the plurality of memory dies via the fourth port is based on the first bit including a second value.

Aspect 11: The apparatus of any of aspects 7 through 10, further including: a first set of datapath blocks coupled with a first subset of the plurality of memory dies and a second set of datapath blocks coupled with a second subset of the plurality of memory dies, where each of the first set of datapath blocks and the second set of datapath blocks are configured to perform an error correction procedure on data communicated between the host controller and a respective memory die.

Aspect 12: The apparatus of aspect 11, where the first set of datapath blocks is located in a first portion of an intermediate block, the second set of datapath blocks is located in a second portion of the intermediate block, and the first set of controllers and the second set of controllers are located in a third portion of the intermediate block, the third portion located between and adjacent to the first portion and the second portion.

Aspect 13: The apparatus of aspect 12, where each controller of the first set of controllers is adjacent to a controller of the second set of controllers.

Aspect 14: The apparatus of any of aspects 7 through 13, further including: a set of repair blocks, each repair block of the set of repair blocks configured to perform a repair procedure on a set of memory die of the plurality of memory dies that are coupled with a fourth port that is common to a respective controller of the first set of controllers and a respective controller of the second set of controllers.

Aspect 15: The apparatus of any of aspects 7 through 14, further including: a processor coupled with the plurality of interface blocks that is configured to perform a boot procedure for the apparatus, the processor configured to receive repair data from one or more fuses via the first set of controllers or the second set of controllers, the repair data associated with a repair procedure for the plurality of memory dies.

Aspect 16: The apparatus of aspect 15, where the processor is configured to initiate a procedure to redirect a column associated with a memory die of the plurality of memory dies from a first column of the memory die to a second column of the memory die via the first set of controllers or the second set of controllers.

Aspect 17: The apparatus of any of aspects 7 through 16, where: each third port of the set of third ports includes a plurality of contacts configured to be coupled with one or more through-silicon-vias associated with the plurality of memory dies; and each of the fourth ports include a driver configured to receive commands associated with a memory die of the plurality of memory dies via the one of the first set of controllers and the one of the second set of controllers.

An apparatus is described. The following provides an overview of aspects of the apparatus as described herein:

Aspect 18: An apparatus, including: a first set of controllers, each respective controller of the first set of controllers coupled with a respective memory die of a first set of memory dies via a first data port and a command port of a respective interface block of a set of interface blocks; a second set of controllers, each respective controller of the second set of controllers coupled with a respective memory die of a second set of memory dies via a second data port and the command port of the respective interface block; and a set of repair blocks, each respective repair block of the set of repair blocks configured to perform address swapping based on receiving repair data from a first set of fuses via the respective command port, the repair data associated with the first set of memory dies and a second set of fuses associated with the second set of memory dies, where each respective repair block of the set of repair blocks includes a respective memory array for storing the repair data.

Aspect 19: The apparatus of aspect 18, where, to perform address swapping, each respective repair block of the set of repair blocks is configured to: redirect a row address from a first row of a respective first memory die of the first set of memory dies to a second row of the respective first memory die based on the repair data received from the respective first set of fuses; and redirect a row address from a third row of a respective second memory die of the second set of memory dies to a fourth row of the respective second memory die based on the repair data received from the respective second fuse.

Aspect 20: The apparatus of any of aspects 18 through 19, where, to perform address swapping, each respective repair block of the set of repair blocks is configured to: redirect a column address from a first column of a respective first memory die of the first set of memory dies to a second column of the respective first memory die based on the repair data received from the respective first set of fuses via the respective command port; and redirect a column address from a third column of a respective second memory die of the second set of memory dies to a fourth column of the respective second memory die based on the repair data received from the respective second set of fuses via the respective command port.

Aspect 21: The apparatus of any of aspects 18 through 20, where each respective repair block of the set of repair blocks includes a respective memory array for storing the repair data.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The terms "layer" and "level" used herein refer to an organization (e.g., a stratum, a sheet) of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, or materials. In some examples, one layer or level may be composed of two or more sublayers or sublevels.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:

a plurality of interface blocks, each of the plurality of interface blocks comprising a first port configured for communication of data with a host controller and a second port configured for communication of commands with the host controller;

a first set of controllers, each controller of the first set of controllers coupled with one of a first subset of the plurality of interface blocks;

a second set of controllers, each controller of the second set of controllers coupled with one of a second subset of the plurality of interface blocks; and a plurality of contact blocks, each of the plurality of contact blocks comprising a set of third ports configured for communication of data with a plurality of memory dies and a fourth port configured for communication of commands with the plurality of memory dies, wherein, for each of the plurality of contact blocks, each third port of the set of third ports is coupled with one of the first set of controllers or one of the second set of controllers, and the fourth port is common to the one of the first set of controllers and the one of the second set of controllers.

2. The apparatus of claim 1, wherein each of the plurality of contact blocks is operable to couple a respective controller of the first set of controllers with a respective first memory die of the plurality of memory dies via the fourth port and a respective third port of the set of third ports.

3. The apparatus of claim 2, wherein each of the plurality of contact blocks is operable to couple a respective controller of the second set of controllers with a respective second memory die of the plurality of memory dies via the fourth port and a respective third port of the set of third ports, the respective second memory die different from the respective first memory die.

4. The apparatus of claim 3, wherein:

coupling a first controller with a first memory die of a first subset of the plurality of memory dies via a fourth port of the fourth ports is based on a first bit associated with the fourth port comprising a first value; and coupling a second controller with a second memory die of a second subset of the plurality of memory dies via the fourth port is based on the first bit comprising a second value.

5. The apparatus of claim 1, further comprising:

a first set of datapath blocks coupled with a first subset of the plurality of memory dies and a second set of datapath blocks coupled with a second subset of the plurality of memory dies, wherein each of the first set of datapath blocks and the second set of datapath blocks are configured to perform an error correction procedure on data communicated between the host controller and a respective memory die.

6. The apparatus of claim 5, wherein the first set of datapath blocks is located in a first portion of an intermediate block, the second set of datapath blocks is located in a second portion of the intermediate block, and the first set of controllers and the second set of controllers are located in a third portion of the intermediate block, the third portion located between and adjacent to the first portion and the second portion.

7. The apparatus of claim 6, wherein each controller of the first set of controllers is adjacent to a controller of the second set of controllers.

8. The apparatus of claim 1, further comprising:

a set of repair blocks, each repair block of the set of repair blocks configured to perform a repair procedure on a set of memory die of the plurality of memory dies that are coupled with a fourth port that is common to a respective controller of the first set of controllers and a respective controller of the second set of controllers.

9. The apparatus of claim 1, further comprising:

a processor coupled with the plurality of interface blocks that is configured to perform a boot procedure for the apparatus, the processor configured to receive repair data from one or more fuses via the first set of controllers or the second set of controllers, the repair data associated with a repair procedure for the plurality of memory dies.

10. The apparatus of claim 9, wherein the processor is configured to initiate a procedure to redirect a column associated with a memory die of the plurality of memory dies from a first column of the memory die to a second column of the memory die via the first set of controllers or the second set of controllers.

11. The apparatus of claim 1, wherein:

each third port of the set of third ports comprises a plurality of contacts configured to be coupled with one or more through-silicon-vias associated with the plurality of memory dies; and each of the fourth ports comprise a driver configured to receive commands associated with a memory die of the plurality of memory dies via the one of the first set of controllers and the one of the second set of controllers.

12. A method, comprising:

receiving a set of parameters for a memory interface block, wherein the set of parameters comprises a quantity of memory dies, a memory size, or a combination thereof;

generating, based at least in part on the set of parameters, a layout for a host controller interface block comprising a plurality of interface blocks, each interface block comprising a first port configured for communication of data with a host controller and a second port configured for communication of commands with the host controller;

generating, based at least in part on the set of parameters, a layout for a section comprising a plurality of contact blocks, each of the plurality of contact blocks comprising:

a set of third ports configured for communication of data with a plurality of memory dies; and a fourth port configured for communication of commands with the plurality of memory dies, wherein the set of third ports comprises a first subset of the set of third ports located in a first portion of the memory interface block and a second subset of the set of third ports located in a second portion of the memory interface block; and generating, based at least in part on the set of parameters, a layout for an intermediate block comprising a plurality of controllers and a plurality of datapath blocks between the host controller interface block and the memory interface block.

13. The method of claim 12, wherein generating the layout for the intermediate block further comprises:

generating the intermediate block based on a first dimension and a second dimension, wherein the first dimension is based on the set of parameters and the second dimension is independent of the set of parameters.

14. The method of claim 13, wherein a quantity of the plurality of controllers is based on the set of parameters, a quantity of the plurality of datapath blocks is based on the set of parameters, and generating the layout for the intermediate block further comprises:

generating each controller of the plurality of controllers based on the first dimension and a third dimension, the third dimension based on the quantity of the plurality of controllers; and generating each datapath block of the plurality of datapath blocks based on the first dimension and a fourth dimension, the fourth dimension based on the quantity of the plurality of datapath blocks.

15. The method of claim 12, wherein the fourth ports are located in a third portion of the memory interface block, the third portion of the memory interface block located in between and adjacent to the first portion of the memory interface block and the second portion of the memory interface block.

16. The method of claim 12, wherein:

the plurality of datapath blocks comprises a first subset of the plurality of datapath blocks located in a first portion of the intermediate block and a second subset of the plurality of datapath blocks is located in a second portion of the intermediate block; and the plurality of controllers is located in a third portion of the intermediate block, the third portion of the intermediate block located in between and adjacent to the first portion of the intermediate block and the second portion of the intermediate block.

17. An apparatus, comprising:

means for receiving a set of parameters for a memory interface block, wherein the set of parameters comprises a quantity of memory dies, a memory size, or a combination thereof;

means for generating, based at least in part on the set of parameters, a layout for a host controller interface block comprising a plurality of interface blocks, each interface block comprising a first port configured for communication of data with a host controller and a second port configured for communication of commands with the host controller;

means for generating, based at least in part on the set of parameters, a layout for a section comprising a plurality of contact blocks, each of the plurality of contact blocks comprising:

a set of third ports configured for communication of data with a plurality of memory dies; and a fourth port configured for communication of commands with the plurality of memory dies, wherein the set of third ports comprises a first subset of the set of third ports located in a first portion of the memory interface block and a second subset of the set of third ports located in a second portion of the memory interface block; and means for generating, based at least in part on the set of parameters, a layout for an intermediate block comprising a plurality of controllers and a plurality of datapath blocks between the host controller interface block and the memory interface block.

18. The apparatus of claim 17, wherein the means for generating the layout for the intermediate block generates the intermediate block based on a first dimension and a second dimension, wherein the first dimension is based on the set of parameters and the second dimension is independent of the set of parameters.

19. The apparatus of claim 18, wherein a quantity of the plurality of controllers is based on the set of parameters, a quantity of the plurality of datapath blocks is based on the set of parameters, and the means for generating the layout for the intermediate block further comprises:

means for generating each controller of the plurality of controllers based on the first dimension and a third dimension, the third dimension based on the quantity of the plurality of controllers; and means for generating each datapath block of the plurality of datapath blocks based on the first dimension and a fourth dimension, the fourth dimension based on the quantity of the plurality of datapath blocks.

20. The apparatus of claim 17, wherein the fourth ports are located in a third portion of the memory interface block, the third portion of the memory interface block located in between and adjacent to the first portion of the memory interface block and the second portion of the memory interface block.

* * * * *